United States Patent
Wu et al.

(10) Patent No.: US 11,853,352 B2
(45) Date of Patent: Dec. 26, 2023

(54) METHOD AND APPARATUS FOR ESTABLISHING IMAGE SET FOR IMAGE RECOGNITION, NETWORK DEVICE, AND STORAGE MEDIUM

(71) Applicant: TENCENT TECHNOLOGY (SHENZHEN) COMPANY LIMITED, Shenzhen (CN)

(72) Inventors: Baoyuan Wu, Shenzhen (CN); Weidong Chen, Shenzhen (CN); Wei Liu, Shenzhen (CN); Yanbo Fan, Shenzhen (CN); Tong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 679 days.

(21) Appl. No.: 17/073,051

(22) Filed: Oct. 16, 2020

(65) Prior Publication Data

US 2021/0034919 A1 Feb. 4, 2021

Related U.S. Application Data

(63) Continuation of application No. PCT/CN2019/110366, filed on Oct. 10, 2019.

(30) Foreign Application Priority Data

Oct. 10, 2018 (CN) .......................... 201811180283.7

(51) Int. Cl.
*G06F 16/58* (2019.01)
*G06F 16/55* (2019.01)
(Continued)

(52) U.S. Cl.
CPC ............ *G06F 16/58* (2019.01); *G06F 16/535* (2019.01); *G06F 16/55* (2019.01); *G06N 20/00* (2019.01);
(Continued)

(58) Field of Classification Search
CPC ........ G06F 16/58; G06F 16/535; G06F 16/55; G06N 20/00; G06N 3/08; G06N 5/022;
(Continued)

(56) References Cited

U.S. PATENT DOCUMENTS 8,909,563 B1 * 12/2014 Jing .................. G06V 20/10
706/22
9,875,301 B2 * 1/2018 Hua .................. G06N 20/00
(Continued)

FOREIGN PATENT DOCUMENTS

CN 102298606 A 12/2011
CN 103530403 A * 1/2014 ....... G06F 17/30256
(Continued)

OTHER PUBLICATIONS

China National Intellectual Property Administration (CNIPA) Office Action 1 for 201811180283.7, dated Sep. 14, 2022 8 Pages (including translation).
(Continued)

*Primary Examiner* — Matthew C Bella
*Assistant Examiner* — Pardis Sohraby
(74) *Attorney, Agent, or Firm* — ANOVA LAW GROUP, PLLC

(57) ABSTRACT

A method of establishing an image set for image recognition includes obtaining a single-label image set comprising an image annotated with a single label, and a multi-label image set comprising an image annotated with a plurality of labels; converting content of each label into a corresponding word identifier according to a semantic network, to obtain a word
(Continued)

identifier set, a converted single-label image set, and a converted multi-label image set; and constructing a hierarchical semantic structure according to the word identifier set and the semantic network. The method also includes performing label supplementation on the image in the converted single-label image set to obtain a supplemented single-label image set; performing label supplementation on the supplemented single-label image set to obtain a final supplemented image set; and establishing a target multi-label image set to train an image recognition model by using the target multi-label image set.

20 Claims, 8 Drawing Sheets

(51) Int. Cl.
*G06N 20/00* (2019.01)
*G06F 16/535* (2019.01)
*G06V 30/262* (2022.01)
*G06V 30/19* (2022.01)
*G06V 20/30* (2022.01)

(52) U.S. Cl.
CPC ........ *G06V 20/30* (2022.01); *G06V 30/19173* (2022.01); *G06V 30/274* (2022.01)

(58) Field of Classification Search
CPC .... G06N 5/04; G06V 20/30; G06V 30/19173; G06V 30/274

USPC ........................................................ 382/159
See application file for complete search history.

(56) References Cited

U.S. PATENT DOCUMENTS

| | | | |
|---|---|---|---|
| 10,026,020 B2* | 7/2018 | Jin | G06V 20/70 |
| 10,282,643 B2* | 5/2019 | Liu | G06F 18/24 |
| 2016/0140104 A1* | 5/2016 | Miller | G06F 40/295 704/9 |
| 2017/0011279 A1* | 1/2017 | Soldevila | G06V 30/226 |
| 2021/0073272 A1* | 3/2021 | Garrett | G06F 16/535 |

FOREIGN PATENT DOCUMENTS

| | | |
|---|---|---|
| CN | 103530403 A | 1/2014 |
| CN | 103714178 A | 4/2014 |
| CN | 104021224 A | 9/2014 |
| CN | 107391703 A | 11/2017 |
| CN | 107679580 A | 2/2018 |
| CN | 107766873 A | 3/2018 |
| CN | 108416384 A | 8/2018 |
| CN | 110162644 A | 8/2019 |

OTHER PUBLICATIONS

The World Intellectual Property Organization (WIPO) International Search Report for PCT/CN2019/110366 dated Jan. 15, 2020 6 Pages (including translation).

* cited by examiner

METHOD AND APPARATUS FOR ESTABLISHING IMAGE SET FOR IMAGE RECOGNITION, NETWORK DEVICE, AND STORAGE MEDIUM

RELATED APPLICATIONS

This application is a continuation application of PCT Patent Application No. PCT/CN2019/110366, filed on Oct. 10, 2019, which claims priority to Chinese Patent Application No. 201811180283.7, entitled "METHOD AND APPARATUS FOR ESTABLISHING IMAGE SET, AND STORAGE MEDIUM" filed with the China National Intellectual Property Administration on Oct. 10, 2018, which is incorporated herein by reference in its entirety.

FIELD OF THE TECHNOLOGY

This application relates to the field of communication technologies, and specifically, to a method and an apparatus for establishing an image set for image recognition, a network device, and a storage medium.

BACKGROUND

With the development of deep learning (DL) models and training methods, great progress has been made in the field of computer vision, and the research interest gradually changes from low-level image processing and image recognition to high-level visual understanding. Complex visual tasks require a deep neural network with better visual representation potential, and an important condition for transforming the potential into a visual representation capability is a large-scale image dataset.

An image source and image annotation are mainly required to establish a large-scale image dataset. Currently, an image source is readily available, and a large quantity of images can be obtained from the Internet at low costs. However, image annotation requires high costs and is therefore one of the main bottlenecks in the establishment of large-scale image datasets. The disclosed methods and systems are directed to solve one or more problems set forth above and other problems.

SUMMARY

An aspect of the present disclosure includes a method for establishing an image set for image recognition performed by a network device. The method includes obtaining a single-label image set and a multi-label image set, the single-label image set comprising an image annotated with a single label, and the multi-label image set comprising an image annotated with a plurality of labels; and converting content of each label into a corresponding word identifier according to a semantic network, to obtain a word identifier set, a converted single-label image set, and a converted multi-label image set. The method also includes constructing a hierarchical semantic structure according to the word identifier set and the semantic network, the hierarchical semantic structure comprising a semantic relationship between word identifiers; and performing label supplementation on the image in the converted single-label image set according to the semantic relationship between word identifiers, to obtain a supplemented single-label image set. The method also includes performing label supplementation on the image in the supplemented single-label image set based on a cooccurrence probability of a word identifier in the supplemented single-label image set and a word identifier in the converted multi-label image set, to obtain a final supplemented image set; and establishing a target multi-label image set according to the final supplemented image set and the converted multi-label image set, to train an image recognition model by using the target multi-label image set.

Another aspect of the present disclosure includes a network device. The network device includes a memory storing computer program instructions, and a processor coupled to the memory. When executing the computer program instructions, the processor is configured to perform: obtaining a single-label image set and a multi-label image set, the single-label image set comprising an image annotated with a single label, and the multi-label image set comprising an image annotated with a plurality of labels; converting content of each label into a corresponding word identifier according to a semantic network, to obtain a word identifier set, a converted single-label image set, and a converted multi-label image set; constructing a hierarchical semantic structure according to the word identifier set and the semantic network, the hierarchical semantic structure comprising a semantic relationship between word identifiers; performing label supplementation on the image in the converted single-label image set according to the semantic relationship between word identifiers, to obtain a supplemented single-label image set; performing label supplementation on the image in the supplemented single-label image set based on a cooccurrence probability of a word identifier in the supplemented single-label image set and a word identifier in the converted multi-label image set, to obtain a final supplemented image set; and establishing a target multi-label image set according to the final supplemented image set and the converted multi-label image set, to train an image recognition model by using the target multi-label image set.

Another aspect of the present disclosure includes non-transitory computer-readable storage medium. The non-transitory computer-readable storage medium stores computer program instructions executable by at least one processor to perform: obtaining a single-label image set and a multi-label image set, the single-label image set comprising an image annotated with a single label, and the multi-label image set comprising an image annotated with a plurality of labels; converting content of each label into a corresponding word identifier according to a semantic network, to obtain a word identifier set, a converted single-label image set, and a converted multi-label image set; constructing a hierarchical semantic structure according to the word identifier set and the semantic network, the hierarchical semantic structure comprising a semantic relationship between word identifiers; performing label supplementation on the image in the converted single-label image set according to the semantic relationship between word identifiers, to obtain a supplemented single-label image set; performing label supplementation on the image in the supplemented single-label image set based on a cooccurrence probability of a word identifier in the supplemented single-label image set and a word identifier in the converted multi-label image set, to obtain a final supplemented image set; and establishing a target multi-label image set according to the final supplemented image set and the converted multi-label image set, to train an image recognition model by using the target multi-label image set.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly describes the accompanying drawings for describing the embodiments. Apparently, the accompanying drawings in the following description show merely some embodiments of the present disclosure, and a person skilled in the art may derive other drawings from these accompanying drawings without creative efforts.

DETAILED DESCRIPTION

Figure 1A:
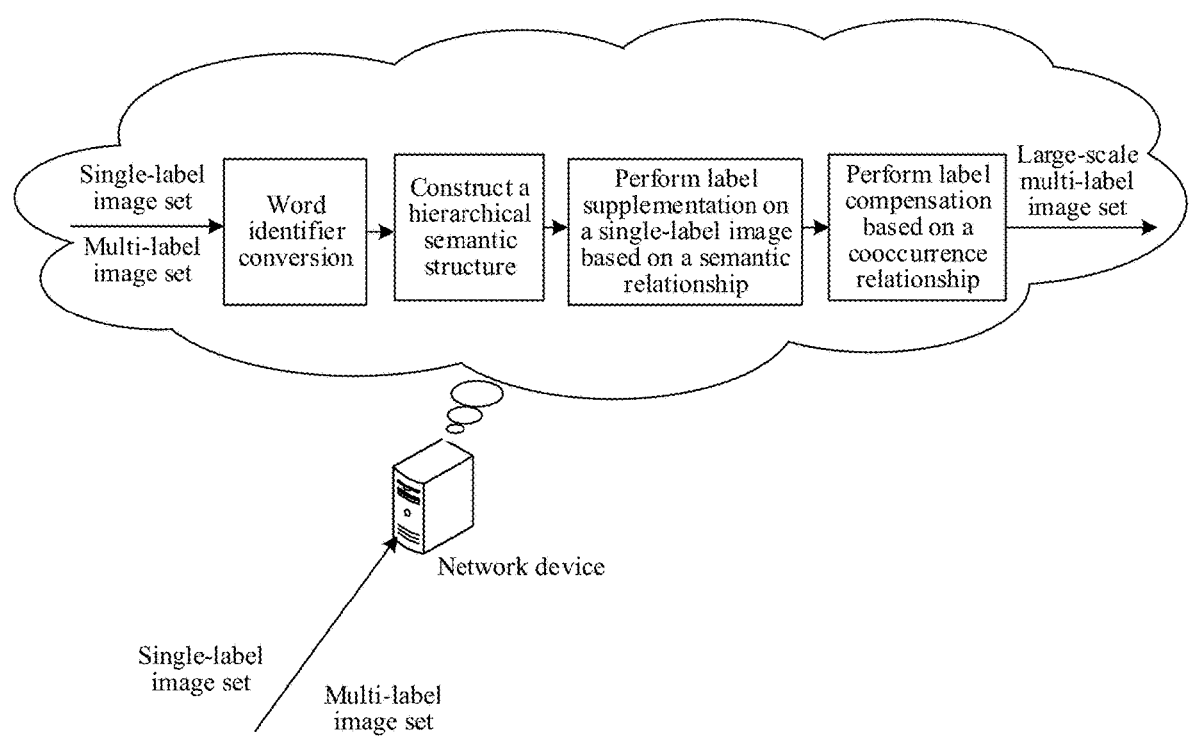
FIG. 1A is a schematic diagram of a scenario of a method for establishing an image set according to an embodiment of the present disclosure.

The following clearly describes the technical solutions in the embodiments of the present disclosure with reference to the accompanying drawings. Apparently, the described embodiments are merely some rather than all of the embodiments of the present disclosure. Other embodiments obtained by a person skilled in the art based on the disclosed embodiments of the present disclosure without creative efforts shall fall within the protection scope of the present disclosure.

Currently, DL is one of the technology and research fields of machine learning. Artificial intelligence (AI) is implemented in a computer system by establishing an artificial neural network having a hierarchical structure.

AI is a theory, a method, a technology and an application system that use digital computers or machines controlled by digital computers to simulate, extend, and expand human intelligence, perceive the environment, acquire knowledge, and use the knowledge to obtain optimal results. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

AI technology is a comprehensive discipline, and relates to a wide range of fields including both hardware-level technologies and software-level technologies. AI foundational technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning/DL.

Since DL is successfully applied to the vision field, researchers also introduce DL into the field of image description, and a DL neural network model is trained by using a large-scale multi-label image dataset, to complete tasks related to image recognition.

Due to high costs of image annotation during the establishment of a large-scale image dataset, most of the currently disclosed large-scale image datasets such as ImageNet are single-label image datasets. However, in an actual case, a plurality of objects are expressed in most images. If only a single label is given, both information loss and information confusion (for example, similar images are annotated with two different object categories) are caused. In addition, a representation capability of a deep neural network trained on a single-label image dataset is also correspondingly affected. Therefore, during DL, a large-scale multi-label image set is required in most cases. A multi-label image can avoid such information loss and confusion, so that a deep neural network having a better visual representation capability is trained.

Currently, a manual annotation manner is often used to establish a large-scale multi-label image set, that is, a plurality of labels are manually annotated for each image. The speed of manual annotation is relatively low, causing low efficiency of establishing the large-scale multi-label image set.

Therefore, the embodiments of the present disclosure provide a method and an apparatus for establishing an image set for image recognition and a storage medium.

The apparatus for establishing an image set may be specifically integrated into a network device, for example, a device such as a terminal or a server. For example, referring to FIG. 1A, the network device may obtain a single-label image set and a multi-label image set. For example, the network device may search for a single-label image by using an image search engine, to obtain a single-label image set, and search for a multi-label image by using the image search engine, to obtain a multi-label image set (the single-label image set includes an image annotated with a single label, and the multi-label image set includes an image annotated with a plurality of labels). Next, the network device may convert the content of a label into a corresponding word identifier according to a semantic network, to obtain a word identifier set, a converted single-label image set, and a converted multi-label image set; construct a hierarchical semantic structure according to the word identifier set and the semantic network, the hierarchical semantic structure including a semantic relationship between word identifiers; perform label supplementation on the image in the converted single-label image set according to the semantic relationship between word identifiers, to obtain a supplemented single-label image set; perform label supplementation on the image in the supplemented single-label image set based on a cooccurrence probability of a word identifier in the supplemented single-label image set and a word identifier in the converted multi-label image set, to obtain a final supplemented image set; and establish a target multi-label image set according to the final supplemented image set and the converted multi-label image set, to train an image recognition model by using the target multi-label image set.

In one embodiment of the present disclosure, descriptions are provided from the perspective of an apparatus for establishing an image set. The apparatus for establishing an image set may be specifically integrated into a network device such as a terminal or a server.

Figure 1B:
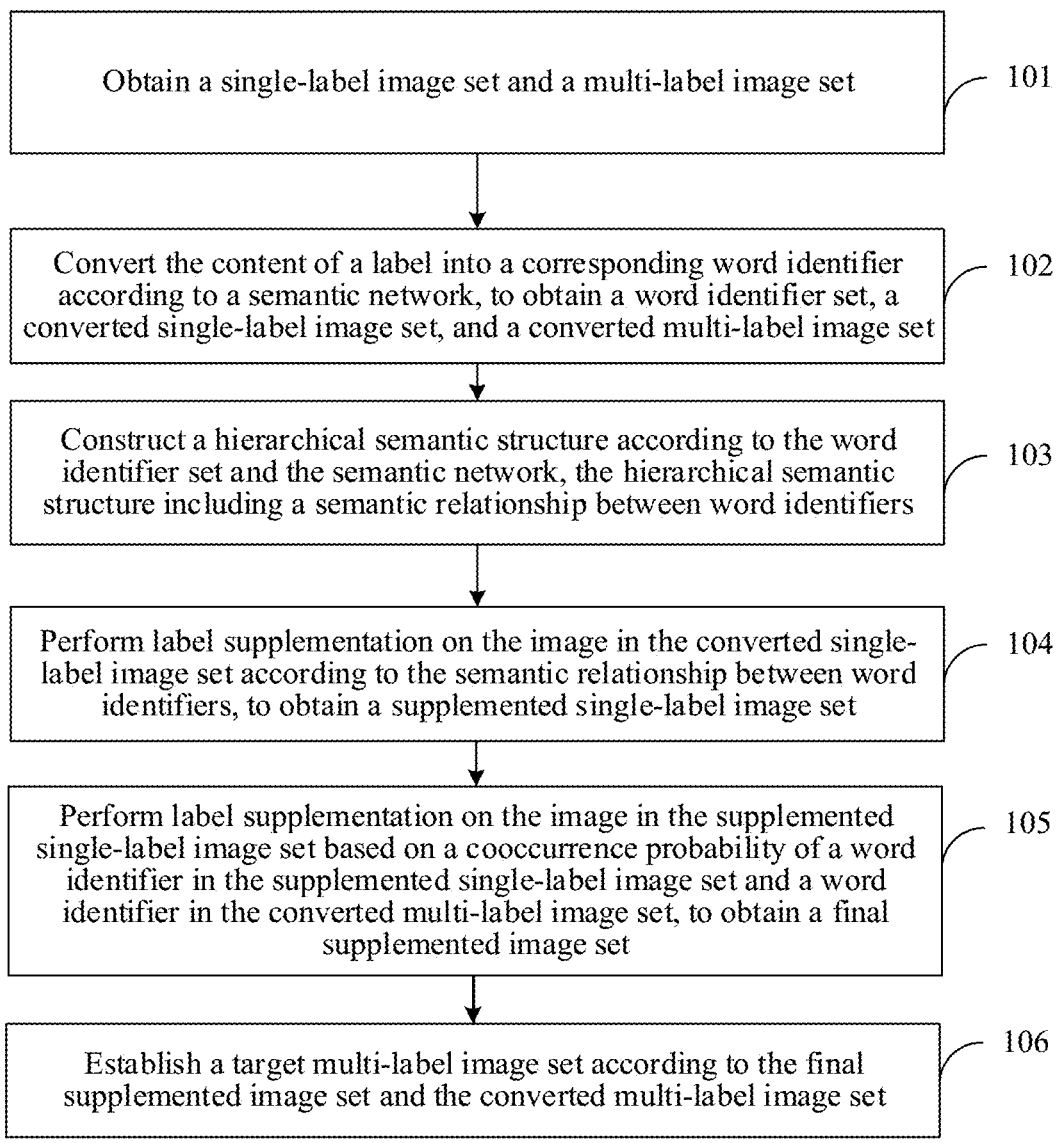
FIG. 1B is a schematic flowchart of a method for establishing an image set according to an embodiment of the present disclosure.

An embodiment of the present disclosure also provides a method for establishing an image set for image recognition. The method may be performed by a network device. As shown in FIG. 1B, a specific process of the method for establishing an image set may include the followings.

101: Obtain a single-label image set and a multi-label image set.

In one embodiment of the present disclosure, the objective of establishing an image set may be establishing a large-scale multi-label image set. The large-scale multi-label image set includes a plurality of images, and each image is annotated with a plurality of labels.

The single-label image set may include at least one image, and each image is annotated with a single label, that is, one label (for example, an object category). The image may be referred to as a single-label image, and the single-label image set covers a plurality of object categories.

During actual application, the single-label image set may be a single-label image set currently disclosed in the industry. For example, the single-label image set may be a Corel5k image set (including 4999 images and covering 260 object categories), an ESP Game image set (including 20770 images and covering 268 object categories), an IAPRTC-12 image set (including 19627 images and covering 291 object categories), NUSWIDE (including 270K images and covering 81 object categories), an MS-COCO image set (including 330K images and covering 80 object categories), a PASCAL VOC 2007 image set (including 9963 images and covering 20 object categories) or an ImageNet image set that may include 14197122 images and cover 21841 object categories.

The multi-label image set may include at least one image annotated with a plurality of labels (for example, a plurality of object categories), and the image may be referred to as a multi-label image. The multi-label image set may include a plurality of multi-label images, and covers a plurality of object categories.

During actual application, the multi-label image set may be a multi-label image set currently disclosed in the industry. For example, the multi-label image set may be an Open Images multi-label image set (including 9M images and covering 6K object categories) or a Google internal dataset JFT-300M (including 300M images and covering 18921 object categories).

For example, in one embodiment of the present disclosure, when a large-scale multi-label image set ML-Images is constructed, two relatively large disclosed image datasets may be selected, including Open Images and ImageNet-11K, as shown in the following table:

TABLE 1

| Data source | Label type and annotation method | Label | Image |
| --- | --- | --- | --- |
| ImageNet | Single-label, manual annotation | 21841 | 14197122 |
| OpenImages | Multi-label, semi-automatic annotation | 7881 | 8387522 |

In one embodiment of the present disclosure, the single-label image set and the multi-label image set may be obtained in a plurality of manners. For example, an image search engine may be used to search for a disclosed single-label image to form the single-label image set, and search for a disclosed multi-label image to form the single-label image set. In another example, a disclosed single-label image set and a disclosed multi-label image set, for example, Open Images and ImageNet-11K, may be directly downloaded or pulled.

In one embodiment of the present disclosure, there may be one or more single-label image sets and multi-label image sets. The number of the single-label image sets and the number of the multi-label image sets may be set according to an actual requirement for establishing an image set. For example, one single-label image set and two multi-label image sets may be obtained, or two single-label image sets and one multi-label image set may be obtained.

In one embodiment of the present disclosure, the label content of an image may include a category identifier of the image. For example, the category identifier may include a category number and/or a category name. For example, the label of a single-label image may include a category number /m/056mk, and a corresponding category name metropolis</1108> (namely, metropolis).

102: Convert the content of a label into a corresponding word identifier according to a semantic network, to obtain a word identifier set, a converted single-label image set, and a converted multi-label image set.

In one embodiment of the present disclosure, the content of all labels may be converted into word identifiers, so that a unified hierarchical semantic structure (that is, a new semantic dictionary) may be established subsequently, to perform label supplementation on the image based on the hierarchical semantic structure subsequently, thereby implementing integration of different image sets.

Specifically, the content of labels in all the image sets may be converted into corresponding word identifiers according to the semantic network. For example, the content (for example, a category identifier) of the labels in the single-label image set is converted into word identifiers, and the content (for example, a category identifier) of the labels in the multi-label image set is converted into word identifiers.

The semantic network is a semantic dictionary and is a network formed according to the semantics of words, and is a vocabulary semantic web with wide coverage. Nouns, adjectives, and adverbs are respectively organized into a network of synonyms. Each synonym set represents a basic semantic concept, and the sets are also connected by various relationships. The semantic network may include a mapping relationship between words and word identifiers, a mapping relationship between word identifiers and categories such as category identifiers (category names and category numbers), a semantic relationship between word identifiers (represented by a semantic relationship between categories corresponding to the word identifiers), and the like. For example, the semantic network may be WordNet, where the word identifier is a WordID.

In one embodiment of the present disclosure, the semantic network may be queried for a word identifier corresponding to the label content such as a category identifier, and the label content such as the category identifier is replaced with the word identifier, to implement word identifier conversion. For example, when the label content of an image includes a category identifier of the image such as the category number /m/01n32 of city, WordNet may be searched for a WordID (for example, city.n.01) corresponding to the category identifier (for example, the category number /m/01n32 of city), and the category identifier (for example, the category number /m/01n32 of city) is replaced with the WordID (for example, city.n.01).

A word identifier such as a WordID is used for uniquely identifying a word in the semantic network and may be constituted by a word, a word class, and a word meaning identifier, that is, a word identifier=a word+a word class+a word meaning identifier. The word meaning identifier is used for identifying the meaning of a word. For example, when a plurality of meanings of a word are numbered, the word meaning may be a word meaning number, and the number indicates the meaning of the current word.

For example, in a WordID (city.n.01), "city" is a word, "n" indicates that the word class of "city" is noun, and "01" indicates that the first meaning of the word "city" is chosen.

In one embodiment of the present disclosure, labels in all image sets may be standardized into uniform WordIDs by using WordNet.

In an embodiment, to simplify the label and improve the efficiency of establishing an image set, after the label is converted into the word identifier WordID, repetitive WordIDs may be merged and deduplicated. That is, labels (for example, categories) corresponding to one same WordID are deduplicated.

For example, the label content is a category. A plurality of categories may correspond to one same WordID in the source image sets, that is, the single-label image set and the multi-label image set. In this case, these categories may be merged into one same category. Specifically, after WordID conversion, same WordID may be merged and deduplicated.

Figure 1C:
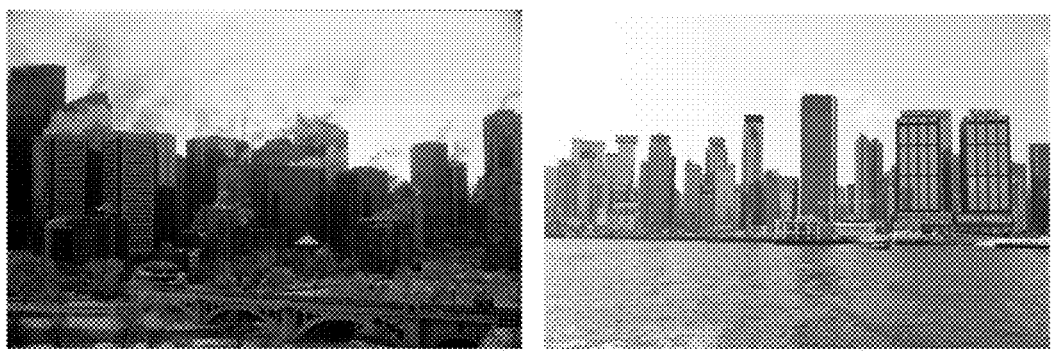
FIG. 1C shows some training images of the category /m/056mk (metropolis) in OpenImage according to an embodiment of the present disclosure.
Figure 1D:
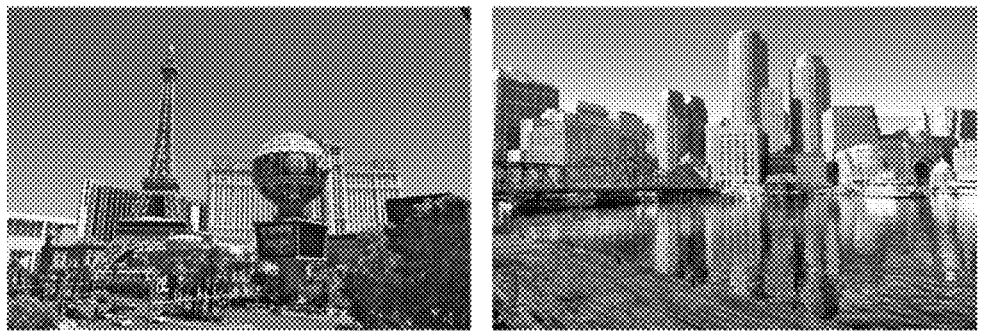
FIG. 1D shows some training images of the category /m/01n32 (city) in OpenImage according to an embodiment of the present disclosure.

For example, the category name corresponding to the category number /m/056mk in OpenImage is metropolis. Some images corresponding to the category are shown in FIG. 1C. It may be determined according to WordNet that a WordID corresponding to the category is city.n.01. Similarly, referring to FIG. 1D, for some training images of the category number /m/01n32 (that is, city), it may be determined according to WordNet that a WordID corresponding to the category is also city.n.01. Therefore, the two categories are repeated/redundant labels, and may be merged and deduplicated. In addition, at the same time, a WordID of the category n08540903 (city) in ImageNet is also city.n.01. Therefore, the categories n08540903, /m/056mk, and /m/01n32 are merged into one same category. In this case, same WordIDs (for example, city.n.01) may be merged and deduplicated. Merging and deduplication of same WordIDs is merging the categories n08540903, /m/056mk, and /m/01n32 into one same category, to simplify the label.

Specifically, the process of "converting the content of a label into a corresponding word identifier according to a semantic network, to obtain a word identifier set, a converted single-label image set, and a converted multi-label image set" may include: converting the content of the label into the corresponding word identifier according to the semantic network, and merging and deduplicating same word identifiers, to obtain the word identifier set, the converted single-label image set, and the converted multi-label image set.

The label conversion and deduplication may be performed in a plurality of manners. For example, the content of all labels in the image sets (the single-label image set and the multi-label image set) may be first converted into word identifiers, and the word identifiers are then merged and deduplicated. Specifically, the process of "converting the content of the label into the corresponding word identifier according to the semantic network, and merging and deduplicating same word identifiers, to obtain the word identifier set, the converted single-label image set, and the converted multi-label image set" may include: converting the content of the label into the corresponding word identifier according to the semantic network, to obtain an initial word identifier set, the converted single-label image set, and the converted multi-label image set; and merging and deduplicating same word identifiers in the initial word identifier set, to obtain the word identifier set.

The initial word identifier set may include word identifiers converted from the label content in the single-label image set and word identifiers converted from the label content in the multi-label image set. For example, the initial word identifier set may be {id1, id2, . . . , idn}.

For example, the label content in the single-label image set and the label content in the multi-label image set may be respectively converted into corresponding WordIDs according to WordNet, to obtain a WordID set {id1, id2, . . . , idn}, a converted single-label image set, and a converted multi-label image set. Next, same WordIDs in the WordID set {id1, id2, . . . , idn} are merged and deduplicated.

In another example, the labels may be converted and deduplicated at the same time. That is, after the content of each label is converted, same WordIDs are merged and deduplicated. Specifically, the process of "converting the content of the label into the corresponding word identifier according to the semantic network, and merging and deduplicating same word identifiers, to obtain the word identifier set, the converted single-label image set, and the converted multi-label image set" may include: determining a label that currently needs to be converted; converting the content of the label into a corresponding word identifier according to the semantic network, and adding the word identifier to a current word identifier set; performing merging and deduplication on the word identifier when there is a member word identifier that is the same as the word identifier in the current word identifier set; and returning to the process of determining a label that currently needs to be converted, until all labels are converted into word identifiers.

For example, it may be determined that the label that currently needs to be converted is a label A. Next, WordNet is queried to obtain a WordID such as id1 corresponding to the label A. In this case, id1 may be added to a current WordID set such as {id1, id2, . . . , idn}. If a WordID that is the same as id1 is present in the current WordID set, id1 is merged and removed. Next, a next label such as a label B that needs to be converted is determined, and the foregoing process is repeatedly performed until all labels are converted into WordIDs.

In an embodiment, one piece of label content may correspond to a plurality of WordIDs. For example, when the label content is a category such as "arm", "arm" may be a specific body part, a weapon or another meaning. Therefore, a plurality of WordIDs such as the WordID of "arm" and the WordID of "weapon" may be obtained by querying Word- Net. In this case, a unique WordID may be selected from the plurality of WordIDs, to improve the accuracy of the hierarchical semantic structure, thereby improving the accuracy of the label of the large-scale image set.

Specifically, the process of "converting the content of a label into a corresponding word identifier according to a semantic network" may include: converting the content of the label into the word identifier according to the semantic network, to obtain a plurality of candidate word identifiers corresponding to the label; and selecting a word identifier corresponding to the image from the plurality of candidate word identifiers according to an image corresponding to the label.

Figure 1E:
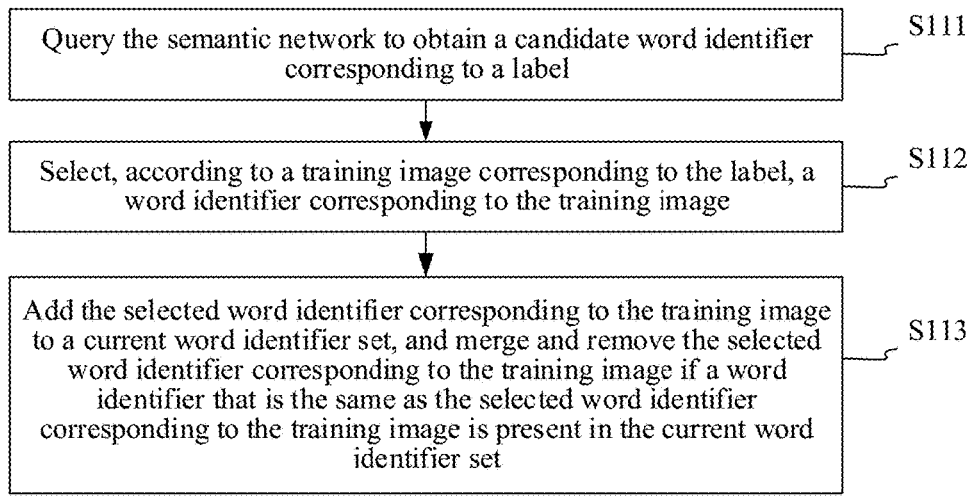
FIG. 1E is a schematic diagram of label conversion and deduplication according to an embodiment of the present disclosure.

For example, FIG. 1E is a schematic diagram of label conversion and deduplication according to an embodiment of the present disclosure. Referring to FIG. 1E, a WordID conversion process may include the followings.

S111: Query the semantic network such as WordNet to obtain a candidate word identifier such as WordIDs including id1, id2, . . . , idn, corresponding to a label A.

S112: Select, according to a training image corresponding to the label A, a word identifier such as id1 corresponding to the training image.

S113: Add the selected word identifier such as id1 corresponding to the training image to a current word identifier set such as WordIDs {id1, id2, . . . , idn}, merge and remove the selected word identifier id1 corresponding to the training image if a word identifier that is the same as the selected word identifier id1 corresponding to the training image is present in the current word identifier set, and then determine a next label such as a label B that needs to be converted and repeatedly perform the foregoing process until all labels are converted into WordIDs.

In an embodiment, to form a concise hierarchical semantic structure and improve the efficiency of establishing an image set, some rare labels in the multi-label image set may be removed. For example, when the label includes a category, rare categories in the multi-label image set may be removed. If a number of images corresponding to a label is less than a preset number in the multi-label image set, the label is determined as a rare label, and such label may be deleted in advance.

Specifically, before the converting the content of a label into a corresponding word identifier according to a semantic network, the method in one embodiment of the present disclosure may further include: obtaining a number of images corresponding to the label in the multi-label image set; and deleting the label in a case that the number of images is less than a preset quantity.

The preset number may be set according to an actual requirement. For example, the preset number may be 650. For example, rare categories in Open Images, that is, category labels with fewer than 650 training images, are deleted, and finally 2039 common categories are kept.

Returning to FIG. 1B, the method for establishing an image set may further include the followings.

103: Construct a hierarchical semantic structure according to the word identifier set and the semantic network, the hierarchical semantic structure including a semantic relationship between word identifiers.

The hierarchical semantic structure is a semantic dictionary. In addition to a semantic relationship between word identifiers (for example, a semantic relationship between words corresponding to word identifiers), the hierarchical semantic structure may further include a mapping relationship (that is, a correspondence) between word identifiers (WordIDs) and categories. The hierarchical semantic structure may include a plurality of tree-like hierarchical semantic structures. Each tree-like semantic structure is formed by nodes, and each node represents one WordID or a category (for example, a category name) corresponding to a WordID. A connection line between nodes represents a semantic relationship between categories or WordIDs.

Figure 1F:
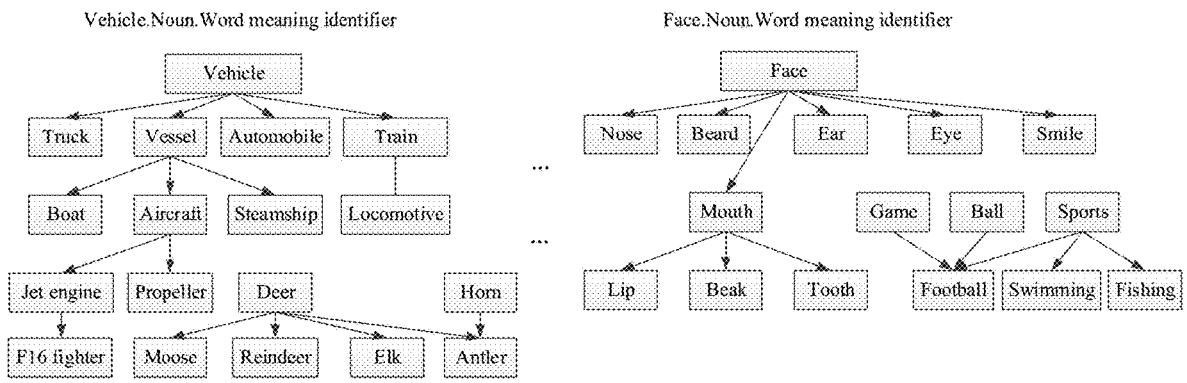
FIG. 1F is a schematic diagram of a hierarchical semantic structure according to an embodiment of the present disclosure.

For example, referring to FIG. 1F, the hierarchical semantic structure includes several tree-like hierarchical semantic structures, and each tree-like hierarchical semantic structure includes a plurality of levels of nodes. Each node may include a category (for example, a category name) corresponding to a WordID. A path between nodes represents a semantic relationship between categories.

In one embodiment of the present disclosure, after the word identifier set is obtained, that is, all labels are converted into WordIDs, a unified hierarchical semantic structure may be constructed according to the semantic relationship between word identifiers in the semantic network. For example, a unified hierarchical semantic structure may be constructed according to a semantic relationship between WordIDs in WordNet.

For example, after the rare categories in Open Images are removed, a hierarchical semantic structure may be constructed in the foregoing described manner, and the hierarchical semantic structure may cover 11166 objects. A hierarchical semantic structure formed by these categories includes a plurality of tree structures. In the structural diagram, the average number of direct child nodes of a node (category) is 57. The category with the most direct child nodes is "herb" with a total of 300 direct subclasses. An average depth of the semantic path (from the root node to the child node) is 7.47, and the deepest path is of 16 levels.

The labels of the plurality of image sets are integrated through the foregoing steps, and one same semantic label system, that is, the hierarchical semantic structure, is formed.

104: Perform label supplementation on the image in the converted single-label image set according to the semantic relationship between word identifiers, to obtain a supplemented single-label image set.

In one embodiment of the present disclosure, after the hierarchical semantic structure is constructed, label supplementation for a single-label image may be implemented based on the semantic relationship between word identifiers in the hierarchical semantic structure. Specifically, a word identifier of a single-label image in the converted single-label image set may be obtained, and the hierarchical semantic structure is queried for an associated word identifier having a semantic relationship with the word identifier. The associated word identifier is supplemented and annotated as a label of the single-label image, to obtain the supplemented single-label image set.

The semantic relationship between word identifiers may include a semantic relationship between categories corresponding to the word identifiers, that is, a semantic relationship between categories, for example, a semantic relationship between the category "city" corresponding to city.n.01 and the category "house" corresponding to house.n.01.

The associated word identifier may include a word identifier corresponding to a category that has a semantic relationship with a category corresponding to another word identifier, for example, a WordID (for example, country.n.01) corresponding to a category (for example, country) that has a semantic relationship with the category (city) corresponding to a WordID (city.n.01).

The semantic relationship may include an upper-lower level semantic relationship, a belonging semantic relationship, a hypernymy-hyponymy semantic relationship, and the like.

For example, a word identifier of a single-label image in the converted single-label image set may be obtained, and the hierarchical semantic structure is queried for an upper-level word identifier to which the word identifier belongs. The upper-level word identifier is supplemented and annotated as a label of the single-label image.

The upper-level word identifier may include a word identifier corresponding to an upper-level category (or a hypernym category, or an ancestor category) that a category corresponding to a word identifier belongs to semantically. For example, if a category corresponding to a WordID is "husky", upper-level categories (or hypernym categories) to which the category belongs may be "dog", "mammal", and "animal", and in this case, the upper-level WordIDs are WordIDs corresponding to "dog", "mammal", and "animal".

In one embodiment of the present disclosure, after the hierarchical semantic structure is obtained, the hierarchical semantic structure may be queried for an associated word identifier having a semantic relationship with a WordID of an image in the single-label image set, and the associated word identifier is then supplemented and annotated as a new label of the image.

For example, if a category corresponding to a WordID of a single-label image is "husky", it may be found from the hierarchical semantic structure that ancestor categories of the category are, for example, "dog", "mammal", and "animal". In this case, WordIDs that correspond to "dog", "mammal", and "animal" may be all annotated as labels of the image.

In the foregoing label supplementation manner based on the semantic relationship, label supplementation may be performed on the single-label image in the single-label image set, to obtain the supplemented single-label image set. In this case, the image in the supplemented single-label image set may be annotated with one or more labels.

105: Perform label supplementation on the image in the supplemented single-label image set based on a cooccurrence probability of a word identifier in the supplemented single-label image set and a word identifier in the converted multi-label image set, to obtain a final supplemented image set.

In one embodiment of the present disclosure, after the label supplementation based on the semantic relationship, label supplementation may further be performed on the image in the supplemented single-label image set based on a cooccurrence relationship, to improve the quality of image annotation.

The cooccurrence probability may be a probability or a frequency that both a word identifier (or a category corresponding to the word identifier) in the supplemented single-label image set and a word identifier (or a category corresponding to the word identifier) in the converted multi-label image set appear on one same image. The cooccurrence probability is used for indicating a cooccurrence relationship, and a higher probability or frequency indicates a stronger cooccurrence relationship.

For ease of description, in one embodiment of the present disclosure, the word identifier in the supplemented single-label image set may be referred to as a first-type word identifier, and the word identifier in the converted multi-label image set may be referred to as a second-type word identifier. In this case, the cooccurrence probability is a probability that both the first-type word identifier and the second-type word identifier appear on the same image, for example, a probability that the first-type word identifier and the second-type word identifier appear on one image in the supplemented single-label image set.

To improve the efficiency and quality of label supplementation, in one embodiment of the present disclosure, when annotation for the single-label image set is considered, it is usually avoided that an image may be annotated with two candidate categories (also this case may occur). Therefore, for a label supplementation range of a single-label image, other categories in a source image set (that is, the single-label image set) to which the single-label image belongs may not be considered, and only a candidate category in another source image set (that is, the multi-label image set) needs to be supplemented. Therefore, when a strong cooccurrence relationship is established, only a combination of categories that are from different source image datasets needs to be considered. That is, only a cooccurrence relationship between the category in the single-label image set and the category in the multi-label image set needs to be considered (a cooccurrence relationship between categories in the single-label image set does not need to be considered). Corresponding to a WordID, only a cooccurrence probability of a WordID (that is, a first-type WordID) in the single-label image set and a WordID (that is, a second-type WordID) in the multi-label image set needs to be calculated.

There may be a plurality of manners of performing label supplementation based on the cooccurrence probability. For example, a word identifier having a strong cooccurrence relationship with the word identifier in the supplemented single-label image set may be determined based on the cooccurrence probability, and the word identifier is then supplemented as a label of an image corresponding to the word identifier in the supplemented single-label image set. That is, the process of "performing label supplementation on the image in the supplemented single-label image set based on a cooccurrence probability of a word identifier in the supplemented single-label image set and a word identifier in the converted multi-label image set" may include: obtaining a cooccurrence probability of a first-type word identifier and a second-type word identifier, the first-type word identifier being a word identifier in the supplemented single-label image set, the second-type word identifier being a word identifier in the converted multi-label image set; determining, in the second-type word identifiers according to the cooccurrence probability, a target word identifier having a strong cooccurrence relationship with the first-type word identifier; and supplementing the target word identifier as a label of an image corresponding to the first-type word identifier in the supplemented single-label image set.

For example, in an embodiment, when the cooccurrence probability of the first-type word identifier and the second-type word identifier is greater than a preset probability, it may be determined that the two word identifiers have a strong cooccurrence relationship. In this case, the second-type word identifier may be supplemented as the label of the image corresponding to the first-type word identifier. The preset probability may be set according to an actual requirement. For example, the preset probability may be 0.5 or 0.6.

In an embodiment, there is usually a semantic relationship between categories having a strong cooccurrence relationship, for example, "husky" and "dog". However, if an image is annotated with "husky", "dog" is certainly a label of the image. Conversely, an image annotated with "dog" cannot necessarily be annotated with "husky". To avoid such inaccurate label supplementation and repetition of the label supplementation based on the semantic relationship, if there is a semantic relationship between two categories, the cooccurrence relationship between the two categories is ignored and is not used for label supplementation, thereby improving the accuracy and quality of label supplementation.

That is, the process of "determining, in the second-type word identifiers according to the cooccurrence probability, a target word identifier having a strong cooccurrence relationship with the first-type word identifier" may include: determining, in the second-type word identifiers, the target word identifier having a strong cooccurrence relationship with the first-type word identifier according to the cooccurrence probability and a semantic relationship between the first-type word identifier and the second-type word identifier.

For example, when the cooccurrence probability of the first-type word identifier (for example, id1) and the second-type word identifier (for example, id2) is greater than the preset probability and there is no semantic relationship between the first-type word identifier and the second-type word identifier, it is determined that there is a strong cooccurrence relationship between the first-type word identifier (for example, id1) and the second-type word identifier (for example, id2), and the second-type word identifier (for example, id2) is the target word identifier having a strong cooccurrence relationship with the first-type word identifier (for example, id1).

In other cases, if the cooccurrence probability is less than the preset probability or there is a semantic relationship between the first-type word identifier and the second-type word identifier, it is determined that the two word identifiers do not have a strong cooccurrence relationship.

Thus, the definition of the strong cooccurrence relationship may include: the cooccurrence probability of two word identifiers is greater than a preset probability and there is no semantic relationship between the two word identifiers.

In one embodiment of the present disclosure, the cooccurrence probability of the first-type word identifier and the second-type word identifier, that is, the cooccurrence probability of the category in the supplemented single-label image set and the category in the converted multi-label image set may be obtained (the word identifier corresponds to the category). The cooccurrence probability is a cooccurrence probability of the first-type word identifier and the second-type word identifier in the supplemented single-label image set, and may be obtained by determining the label for the image in the supplemented single-label image set and then performing counting.

For example, in an embodiment, to improve the accuracy of the cooccurrence probability, a possible category, that is, a possible word identifier, of an image in the supplemented image set may be predicted based on a deep neural network classification model. Next, a supplementary label of the image is determined based on the predicted word identifier. After the supplementary label of each image is determined, the cooccurrence probability may be obtained through counting.

Specifically, the process of "obtaining a cooccurrence probability of a first-type word identifier and a second-type word identifier" may include: classifying, by using a trained classification model, an image with a label to be supplemented in the supplemented single-label image set, to obtain a predicted word identifier of the image with a label to be supplemented and a predicted probability of the predicted word identifier, the trained classification model being trained by using the converted multi-label image set; determining, from the predicted word identifiers according to the predicted probabilities of the predicted word identifiers, a candidate supplementary label of the image with a label to be supplemented, to obtain an image set with the label determined, each image in the image set with the label determined carrying a built-in label and the candidate supplementary label, the built-in label being the word identifier corresponding to the first-type word identifier; and obtaining the cooccurrence probability of the first-type word identifier and the second-type word identifier according to the image set with the label determined.

The trained classification model may be a deep neural network classification model, and is trained on the converted multi-label image set such as Open Images. The predicted word identifier (that is, the predicted category) that is predicted by the deep neural network classification model is a word identifier (or a category) in the converted multi-label image set such as Open Images. In other words, the category or word identifier predicted by the model is a category or word identifier in the converted multi-label image set.

For example, a deep neural network classifier (that is, ResNet-101) may be trained on a training dataset of the converted Open Images, and an image in ImageNet-11K is then predicted by using the classifier, where the predicted category is a candidate category in Open Images.

In one embodiment of the present disclosure, all images in the supplemented single-label image set may be classified by using the deep neural network classification model, to obtain the predicted word identifier (that is, the predicted category) and the predicted probability of each image. Next, for each image, the corresponding predicted word identifier is selected according to the predicted probability of the predicted word identifier, and is determined as the candidate supplementary label of the image. In this way, each image in the supplemented single-label image set corresponds to the original built-in label and the determined candidate supplementary label. Finally, labels and images in the image set with the label determined may be counted, to obtain the cooccurrence probability of the two types of labels (the built-in label and the determined label). The label is the word identifier, and therefore the cooccurrence probability of the two word identifiers is obtained.

In an embodiment, after the predicted word identifier of the image with a label to be supplemented and the predicted probability of the predicted word identifier are obtained, a target predicted word identifier may be selected from the predicted word identifiers according to the predicted probabilities of the predicted word identifiers. For example, a predicted word identifier whose predicted probability is greater than a preset threshold is selected as the target predicted word identifier.

For example, after an image 'a' in the supplemented single-label image set is classified by using the classification model, a predicted WordID and a corresponding predicted probability 'p', for example, id1 (with a predicted probability of p1) or id2 (with a predicted probability of p2), of the image 'a' may be obtained. In this case, a predicted WordID whose predicted probability 'p' is greater than a preset threshold such as 0.95 may be selected as a candidate supplementary label of the image 'a'. If p1 is greater than 0.95, id1 may be selected as the candidate supplementary label of the image 'a', that is, a category corresponding to id1 is selected as a candidate category of the image 'a'.

In an embodiment, after the image set with the label determined is obtained, a number of images, that is, a number of cooccurrent images on which both the first-type word identifier and the second-type word identifier appear may be counted in the image set, and the cooccurrence probability is then calculated according to the number of images. Specifically, the process of "obtaining the cooccurrence probability of the first-type word identifier and the second-type word identifier according to the image set with the label determined" may include: counting, in the image set with the label determined, a number of images on which both the first-type word identifier and the second-type word identifier appear and a total number of images on which the first-type word identifier appears; and obtaining the cooccurrence probability of the first-type word identifier and the second-type word identifier according to the number of images and the total number of images. For example, a ratio of the number of images to the total number of images may be obtained as the cooccurrence probability.

The number of images is the number of images on which both the first-type word identifier and the second-type word identifier appear on the image set, that is, a number of images whose image labels include both the first-type word identifier and the second-type word identifier.

For example, after the image set with the label determined is obtained, a cooccurrence relationship matrix may be constructed by counting the number of images on which both the first-type word identifier and the second-type word identifier appear, where the cooccurrence relationship matrix includes the number of images on which both the first-type word identifier and the second-type word identifier appear. For example, content of the first column of the cooccurrence relationship matrix may be the first-type word identifier (or a category such as a category number and name corresponding to the first-type word identifier) in the supplemented single-label image set, and content of the first row of the cooccurrence relationship matrix may be the second-type word identifier (or a category such as a category number and name corresponding to the second-type word identifier) in the converted multi-label image set.

An example is used in which the word identifier is represented by a category. Referring to the following table, after the candidate supplementary labels are determined, a cooccurrence relationship matrix may be obtained, and the matrix has a dimension of 11K rows and 2039 columns, which respectively correspond to the number of categories in ImageNet-11K and the number of categories in Open Images. As shown in the following table, the content of the first column represents numbers and names of the categories in ImageNet-11K, and the content of the first row represents numbers and names of the categories in Open Images. An (i, j)$^{th}$ element in the table, that is, the number in the matrix element represents a number of all training images that are of the i$^{th}$ category in ImageNet-11K and that are pre-annotated with the j$^{th}$ category in Open Images, that is, a number of images in ImageNet-11K that are annotated with both the i$^{th}$ category in ImageNet-11K and the j$^{th}$ category in Open Images.

TABLE 2

| ImageNet-11K category | Open Images category | | | | |
|---|---|---|---|---|---|
| | /m/03bt1gh (games) | /m/03jj52 (tabletop game) | /m/0ch36lm (ball over a net game) | /m/04tr8s (pc game) | ... |
| n03414029 (game bag) | 4 | 9 | 678 | 369 | ... |
| n03414162 (game equipment) | 54 | 454 | 354 | 89 | ... |
| n04056413 (rat trap) | 54 | 5 | 534 | 78 | ... |
| n04098513 (rocker) | 657 | 54 | 57 | 78 | ... |

TABLE 2-continued

| ImageNet-11K category | Open Images category | | | | |
|---|---|---|---|---|---|
| | /m/03bt1gh (games) | /m/03jj52 (tabletop game) | /m/0ch36lm (ball over a net game) | /m/04tr8s (pc game) | ... |
| n03733281 (maze, labyrinth) | 757 | 97 | 576 | 67 | ... |
| ... | ... | ... | ... | ... | ... |

Next, the table may be normalized, to obtain a cooccurrence probability distribution matrix. Specifically, the (i, j)$^{th}$ element is divided by the number of all training images of the i$^{th}$ category in ImageNet-11K, to obtain a probability between 0 and 1, indicating a probability that an image of the i$^{th}$ category in ImageNet-11K is annotated with the j$^{th}$ category in Open Images. The probability is a probability or frequency of cooccurrence of the i$^{th}$ category in ImageNet-11K and the j$^{th}$ category in Open Images, that is, a probability or frequency of cooccurrence of a WordID of the i$^{th}$ category in ImageNet-11K and a WordID of the j$^{th}$ category in Open Images.

After the normalization, it may be determined whether there is a strong cooccurrence relationship between two categories according to the cooccurrence probability of a category in ImageNet-11K and a category in Open Images and the semantic relationship between the two categories; and if yes, the category in Open Images that has a strong cooccurrence relationship is supplemented and annotated as a label of an image corresponding to the category in ImageNet-11K. For example, if the cooccurrence probability is 0.5 and there is no semantic relationship between the i$^{th}$ category and the j$^{th}$ category, the two categories are defined to have a strong cooccurrence relationship. Further, all categories having a strong cooccurrence relationship with the i$^{th}$ category are supplemented as labels of all training images of the i$^{th}$ category.

106: Establish a target multi-label image set according to the final supplemented image set and the converted multi-label image set, to train an image recognition model by using the target multi-label image set.

Label supplementation may be performed on the image in the single-label image set repeatedly through the foregoing steps, to obtain the final supplemented image set. Next, the target multi-label image set may be established according to the final supplemented image set and the converted multi-label image set. The target multi-label image set may be a large-scale multi-label image set.

For example, the final supplemented image set and the converted multi-label image set may be integrated to form a large-scale multi-label image set.

Accordingly, through the foregoing steps, WordID conversion may be performed on the single-label image set ImageNet, label supplementation is performed based on a semantic relationship, and label supplementation is then performed based on a cooccurrence relationship, to obtain the supplemented ImageNet. WordID conversion may be performed on the multi-label image set Open Images, to obtain the converted Open Images. Next, the supplemented ImageNet and the converted Open Images are integrated, to obtain the required large-scale multi-label image set ML-Images.

It can be learned from the foregoing descriptions that, in one embodiment of the present disclosure, a single-label image set and a multi-label image set are obtained; the content of a label is converted into a corresponding word identifier according to a semantic network, to obtain a word identifier set, a converted single-label image set, and a converted multi-label image set; a hierarchical semantic structure is constructed according to the word identifier set and the semantic network; label supplementation is performed on the image in the converted single-label image set according to a semantic relationship between word identifiers in the hierarchical semantic structure, to obtain a supplemented single-label image set; label supplementation is performed on the image in the supplemented single-label image set based on a cooccurrence probability of a word identifier in the supplemented single-label image set and a word identifier in the converted multi-label image set, to obtain a final supplemented image set; and a target multi-label image set is established according to the final supplemented image set and the converted multi-label image set, to train an image recognition model by using the target multi-label image set. In this solution, a plurality of different image sets may be automatically integrated. In addition, label supplementation is performed on a single-label image based on a relationship between labels and by using a built-in label of the single-label image as a basis, to establish a large-scale multi-label image set. Manual annotation is not required, thereby improving the efficiency of establishing a large-scale multi-label image set and improving the quality of label annotation.

According to the method described in the foregoing embodiment, the following further provides detailed descriptions by using an example.

In one embodiment, descriptions are provided by using an example in which the apparatus for establishing an image set is specifically integrated into a network device.

Figure 2A:
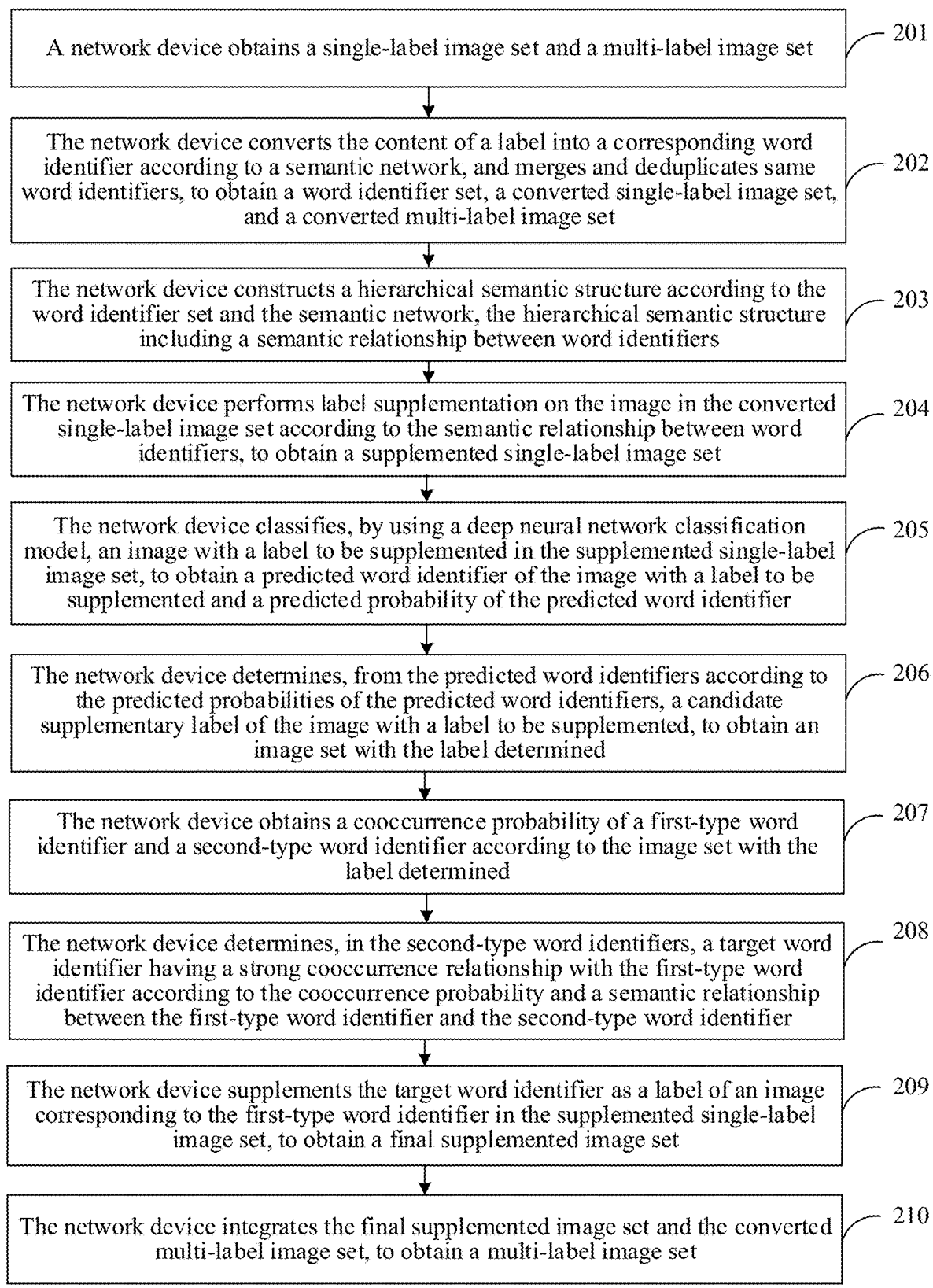
FIG. 2A is a schematic flowchart of establishing a large-scale multi-label image set according to an embodiment of the present disclosure.

A process of establishing a large-scale multi-label image set by the network device is shown in FIG. 2A, and includes the follows.

201: A network device obtains a single-label image set and a multi-label image set.

The single-label image set may include at least one image, and each image is annotated with a single label, that is, one label (for example, an object category). The image may be referred to as a single-label image, and the single-label image set covers a plurality of object categories. For example, the single-label image set may be an ImageNet image set. The ImageNet image set may include 14197122 images and cover 21841 object categories.

The multi-label image set may include at least one image annotated with a plurality of labels (for example, a plurality of object categories), and the image may be referred to as a multi-label image. The multi-label image set may include a plurality of multi-label images, and covers a plurality of object categories. For example, the multi-label image set may be an Open Images multi-label image set (including 9M images and covering 6K object categories).

In one embodiment of the present disclosure, the label content of an image may include a category to which the image belongs, for example, may include a category number and/or a category name. For example, the label of a single-label image may include a category number /m/056mk, and a corresponding category name metropolis.

202: The network device converts the content of a label into a corresponding word identifier according to a semantic network, and merges and deduplicates same word identifiers, to obtain a word identifier set, a converted single-label image set, and a converted multi-label image set.

For example, the network device may convert the content (for example, categories) of labels in all image sets (for example, the ImageNet image set and the Open Images image set) into word identifiers according to the semantic network. For example, the network device may standardize labels in all data sources into uniform WordIDs according to the semantic network WordNet.

The semantic network is a semantic dictionary and is a network formed according to the semantics of words, and is a vocabulary semantic web with wide coverage. Nouns, adjectives, and adverbs are respectively organized into a network of synonyms. Each synonym set represents a basic semantic concept, and the sets are also connected by various relationships. The semantic network may include a mapping relationship between words and word identifiers, a mapping relationship between word identifiers and categories such as category identifiers (category names and category numbers), a semantic relationship between word identifiers (represented by a semantic relationship between categories corresponding to the word identifiers), and the like. For example, the semantic network may be WordNet, where the word identifier is a WordID.

In one embodiment of the present disclosure, to simplify the label and improve the efficiency of establishing an image set, after the label is converted into the word identifier WordID, repetitive WordIDs may be merged and deduplicated. That is, labels (for example, categories) corresponding to one same WordID are deduplicated.

For example, in an embodiment, the network device may convert the content of the label into the corresponding word identifier according to the semantic network, to obtain an initial word identifier set, the converted single-label image set, and the converted multi-label image set; and then merge and deduplicate same word identifiers in the initial word identifier set, to obtain the word identifier set.

The initial word identifier set may include word identifiers converted from the label content in the single-label image set and word identifiers converted from the label content in the multi-label image set. For example, the initial word identifier set may be {id1, id2, . . . , idn}.

In another example, in an embodiment, the network device may convert and deduplicate the labels at the same time. That is, after the content of each label is converted, a same WordID is merged and deduplicated. Specifically, a label that currently needs to be converted is determined; the content of the label is converted into a corresponding word identifier according to the semantic network, and the word identifier is added to a current word identifier set; merging and deduplication are performed on the word identifier when there is a member word identifier that is the same as the word identifier in the current word identifier set; and the process of determining a label that currently needs to be converted is performed repeatedly until all labels are converted into word identifiers.

For example, it may be determined that the label that currently needs to be converted is a label A. Next, WordNet is queried to obtain a WordID such as id1 corresponding to the label A. In this case, id1 may be added to a current WordID set such as {id1, id2, . . . , idn}. If a WordID that is the same as id1 is present in the current WordID set, id1 is merged and removed. Next, a next label such as a label B that needs to be converted is determined, and the foregoing process is repeatedly performed until all labels are converted into WordIDs.

In an embodiment, to form a concise hierarchical semantic structure and improve the efficiency of establishing an image set, some rare labels in the multi-label image set may be removed. For example, when the label includes a category, rare categories in the multi-label image set may be removed. If a number of images corresponding to a label is less than a preset number in the multi-label image set, the label is determined as a rare label, and such label may be deleted in advance.

The preset number may be set according to an actual requirement. For example, the preset number may be 650. For example, rare categories in Open Images, that is, category labels with fewer than 650 training images, are deleted, and finally 2039 common categories are kept.

203: The network device constructs a hierarchical semantic structure according to the word identifier set and the semantic network, the hierarchical semantic structure including a semantic relationship between word identifiers.

The hierarchical semantic structure is a semantic dictionary. In addition to a semantic relationship between word identifiers (for example, a semantic relationship between words corresponding to word identifiers), the hierarchical semantic structure may further include a mapping relationship (that is, a correspondence) between word identifiers (WordIDs) and categories. The hierarchical semantic structure may include a plurality of tree-like hierarchical semantic structures. Each tree-like semantic structure is formed by nodes, and each node represents one WordID, or a category (for example, a category name) corresponding to a WordID. A connection line between nodes represents a semantic relationship between categories or WordIDs.

After obtaining the word identifier set, that is, converting all labels into WordIDs, the network device may construct a unified hierarchical semantic structure according to the semantic relationship between word identifiers in the semantic network. For example, a unified hierarchical semantic structure may be constructed according to a semantic relationship between WordIDs in WordNet.

204: The network device performs label supplementation on the image in the converted single-label image set according to the semantic relationship between word identifiers in the hierarchical semantic structure, to obtain the supplemented single-label image set.

For example, label supplementation may be performed on an image in ImageNet-11K that is obtained after WordID conversion according to the semantic relationship between word identifiers in the hierarchical semantic structure.

Specifically, the network device may obtain a word identifier of a single-label image in the converted single-label image set, and query the hierarchical semantic structure for an associated word identifier having a semantic relationship with the word identifier. The associated word identifier is supplemented and annotated as a label of the single-label image, to obtain the supplemented single-label image set.

The associated word identifier may include a word identifier corresponding to a category that has a semantic relationship with a category corresponding to another word identifier, for example, a WordID (for example, country.n.01) corresponding to a category (for example, country) that has a semantic relationship with the category (city) corresponding to a WordID (city.n.01).

The semantic relationship may include an upper-lower level semantic relationship, a belonging semantic relationship, a hypernymy-hyponymy semantic relationship, and the like.

For example, a word identifier of a single-label image in the converted single-label image set may be obtained, and the hierarchical semantic structure is queried for an upper-level word identifier to which the word identifier belongs. The upper-level word identifier is supplemented and annotated as a label of the single-label image.

The upper-level word identifier may include a word identifier corresponding to an upper-level category (or a hypernym category, or an ancestor category) that a category corresponding to a word identifier belongs to semantically. For example, if a category corresponding to a WordID is "husky", upper-level categories (or hypernym categories) to which the category belongs may be "dog", "mammal", and "animal", and in this case, the upper-level WordIDs are WordIDs corresponding to "dog", "mammal", and "animal".

For example, if a category corresponding to a WordID of a single-label image is "husky", the network device may find from the hierarchical semantic structure that ancestor categories of the category are, for example, "dog", "mammal", and "animal". In this case, WordIDs that correspond to "dog", "mammal", and "animal" may be all annotated as labels of the image.

205: The network device classifies, by using a trained classification model, an image with a label to be supplemented in the supplemented single-label image set, to obtain a predicted word identifier of the image with a label to be supplemented and a predicted probability of the predicted word identifier.

The trained classification model may be a deep neural network classification model, and is trained by using the converted multi-label image set. Specifically, the deep neural network classification model is trained on the converted multi-label image set such as Open Images. The predicted word identifier (that is, the predicted category) that is predicted by the deep neural network classification model is a word identifier (or a category) in the converted multi-label image set such as Open Images. In other words, the category or word identifier predicted by the model is a category or word identifier in the converted multi-label image set.

Figure 2B:
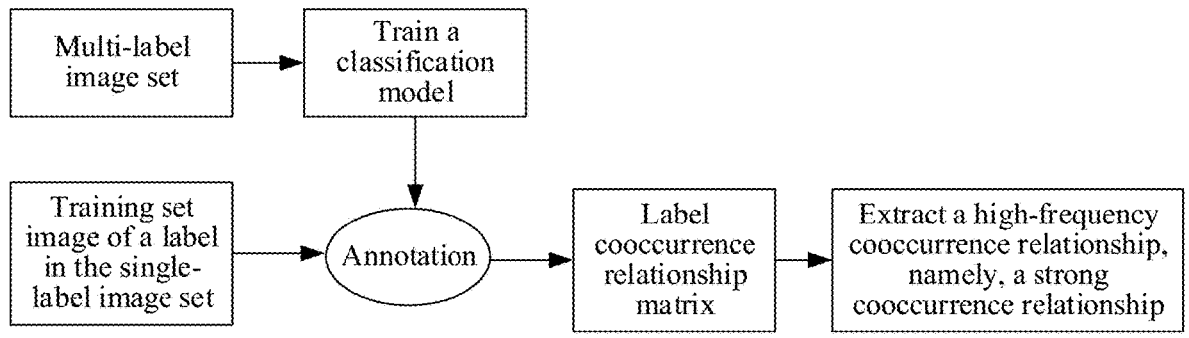
FIG. 2B is a schematic diagram of label supplementation based on a cooccurrence relationship according to an embodiment of the present disclosure.

For example, referring to FIG. 2B, the network device may train a deep neural network classifier (that is, ResNet-101) on a training dataset of the converted multi-label image set such as the converted Open Images, and then perform, by using the classifier, category prediction on an image in the single-label image set that is supplemented based on the semantic relationship, for example, the supplemented ImageNet-11K, where the predicted category is a candidate category in Open Images.

206: The network device determines, from the predicted word identifiers according to the predicted probabilities of the predicted word identifiers, a candidate supplementary label of the image with a label to be supplemented, to obtain an image set with the label determined, each image in the image set with the label determined carrying a built-in label and the candidate supplementary label, the built-in label being the word identifier corresponding to a first-type word identifier.

For example, the network device may select, according to the predicted probability, a corresponding target predicted word identifier from the predicted word identifiers of the image with a label to be supplemented, and then determine the target predicted word identifier as the candidate supplementary label of the image with a label to be supplemented. For example, a predicted word identifier whose predicted probability is greater than a preset threshold (for example, 0.95) may be used as the target predicted word identifier.

The network device may classify all images in the supplemented single-label image set by using the deep neural network classification model, to obtain the predicted word identifier (that is, the predicted category) of each image and the predicted probability. Next, for each image, the corresponding predicted word identifier is selected according to the predicted probability of the predicted word identifier, and is determined as the candidate supplementary label of the image, to obtain the image set with the label determined. In this way, each image in the supplemented single-label image set corresponds to the original built-in label and the determined candidate supplementary label.

207: The network device obtains a cooccurrence probability of a first-type word identifier and a second-type word identifier according to the image set with the label determined.

The cooccurrence probability may be a probability or a frequency that both a word identifier (or a category corresponding to the word identifier) in the supplemented single-label image set and a word identifier (or a category corresponding to the word identifier) in the converted multi-label image set appear on one same image. The cooccurrence probability is used for indicating a cooccurrence relationship, and a higher probability or frequency indicates a stronger cooccurrence relationship.

For ease of description, in one embodiment of the present disclosure, the word identifier in the supplemented single-label image set may be referred to as a first-type word identifier, and the word identifier in the converted multi-label image set may be referred to as a second-type word identifier. In this case, the cooccurrence probability of the first-type word identifier and the second-type word identifier is a probability that both the first-type word identifier and the second-type word identifier appear on the same image, for example, a probability that the first-type word identifier and the second-type word identifier appear on one image in the supplemented single-label image set.

In an embodiment, the network device counts, in the image set with the label determined, a number of images on which both the first-type word identifier and the second-type word identifier appear and a total number of images on which the first-type word identifier appears; and obtains the cooccurrence probability of the first-type word identifier and the second-type word identifier according to the number of images and the total number of images.

For example, after the image set with the label determined is obtained, a cooccurrence relationship matrix may be constructed by counting the number of images on which both the first-type word identifier and the second-type word identifier appear, where the cooccurrence relationship matrix includes the number of images on which both the first-type word identifier and the second-type word identifier appear. For example, content of the first column of the cooccurrence relationship matrix may be the first-type word identifier (or a category such as a category number and name corresponding to the first-type word identifier) in the supplemented single-label image set, and content of the first row of the cooccurrence relationship matrix may be the second-type word identifier (or a category such as a category number and name corresponding to the second-type word identifier) in the converted multi-label image set.

An example is used in which the word identifier is represented by a category. Referring to Table 2, after the candidate supplementary labels are determined, a label cooccurrence relationship matrix may be obtained, and the matrix has a dimension of 11K rows and 2039 columns, which respectively correspond to the number of categories in ImageNet-11K and the number of categories in Open Images. As shown in the following table, the content of the first column represents numbers and names of the categories in ImageNet-11K, and the content of the first row represents numbers and names of the categories in Open Images. An (i, j)$^{th}$ element in the table, that is, the number in the matrix element represents a number of all training images that are of the i$^{th}$ category in ImageNet-11K and that are pre-annotated with the j$^{th}$ category in Open Images, that is, a number of images in ImageNet-11K that are annotated with both the i$^{th}$ category in ImageNet-11K and the j$^{th}$ category in Open Images.

Next, the table may be normalized, to obtain a cooccurrence probability distribution matrix. Specifically, the (i, j)$^{th}$ element is divided by the number of all training images of the i$^{th}$ category in ImageNet-11K, to obtain a probability between 0 and 1, indicating a probability that an image of the i$^{th}$ category in ImageNet-11K is annotated with the j$^{th}$ category in Open Images. The probability is a probability or frequency of cooccurrence of the i$^{th}$ category in ImageNet-11K and the j$^{th}$ category in Open Images, that is, a probability or frequency of cooccurrence of a WordID of the i$^{th}$ category in ImageNet-11K and a WordID of the j$^{th}$ category in Open Images.

208: The network device determines, in the second-type word identifiers, a target word identifier having a strong cooccurrence relationship with the first-type word identifier according to the cooccurrence probability and a semantic relationship between the first-type word identifier and the second-type word identifier.

There is usually a semantic relationship between categories having a strong cooccurrence relationship, for example, "husky" and "dog". However, if an image is annotated with "husky", "dog" is certainly a label of the image. Conversely, an image annotated with "dog" cannot necessarily be annotated with "husky". To avoid such inaccurate label supplementation and repetition of the label supplementation based on the semantic relationship, if there is a semantic relationship between two categories, the cooccurrence relationship between the two categories is ignored and is not used for label supplementation, thereby improving the accuracy and quality of label supplementation.

Specifically, when the cooccurrence probability is greater than a preset probability, and there is no semantic relationship between the first-type word identifier and the second-type word identifier, it is determined that there is a strong cooccurrence relationship between the first-type word identifier and the second-type word identifier. In other cases, if the cooccurrence probability is less than the preset probability or there is a semantic relationship between the first-type word identifier and the second-type word identifier, it is determined that the two word identifiers do not have a strong cooccurrence relationship.

209: The network device supplements the target word identifier as a label of an image corresponding to the first-type word identifier in the supplemented single-label image set, to obtain a final supplemented image set.

Referring to Table 2, after the table is normalized, it may be determined whether there is a strong cooccurrence relationship between two categories according to the cooccurrence probability of a category in ImageNet-11K and a category in Open Images and the semantic relationship between the two categories; and if yes, the category in Open Images that has a strong cooccurrence relationship is supplemented and annotated as a label of an image corresponding to the category in ImageNet-11K. For example, if the cooccurrence probability is 0.5 and there is no semantic relationship between the i$^{th}$ category and the j$^{th}$ category, the two categories are defined to have a strong cooccurrence relationship. Further, all categories having a strong cooccurrence relationship with the i$^{th}$ category are supplemented as labels of all training images of the i$^{th}$ category.

210: The network device integrates the final supplemented image set and the converted multi-label image set, to obtain a target multi-label image set, to train an image recognition model by using the target multi-label image set.

Accordingly, through the foregoing processes, WordID conversion may be performed on the single-label image set ImageNet, label supplementation is performed based on a semantic relationship, and label supplementation is then performed based on a cooccurrence relationship, to obtain the supplemented ImageNet. WordID conversion may be performed on the multi-label image set Open Images, to obtain the converted Open Images. Next, the supplemented ImageNet and the converted Open Images are integrated, to obtain the required large-scale multi-label image set ML-Images.

For example, the ML-Images dataset includes 11166 object categories, and 18019881 images. There are 10505 categories (there are more than 100 training images corresponding to each of the categories) and 18018621 images that can be used for training.

Figure 2C:
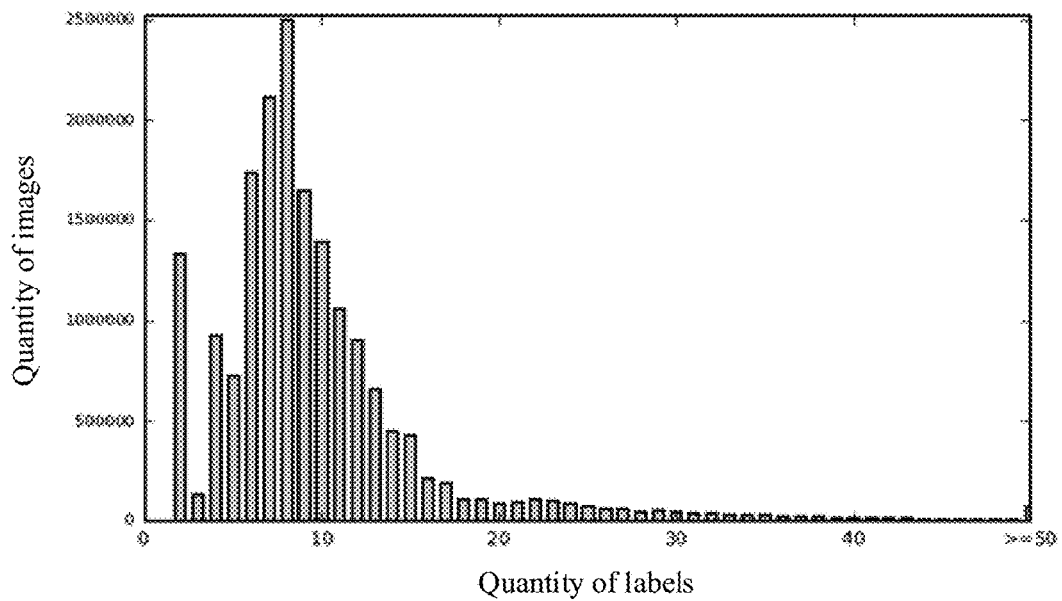
FIG. 2C is a schematic statistical chart of image annotation in an ML-Images dataset according to an embodiment of the present disclosure.

As shown in FIG. 2C, most of the images in the ML-Images dataset have 6 to 12 labels, and the average number of the labels is 9. Some images have more than 50 labels mainly because the images have a relatively large number of labels, and the number of labels is significantly increased after label supplementation by using a semantic topology structure.

Figure 2D:
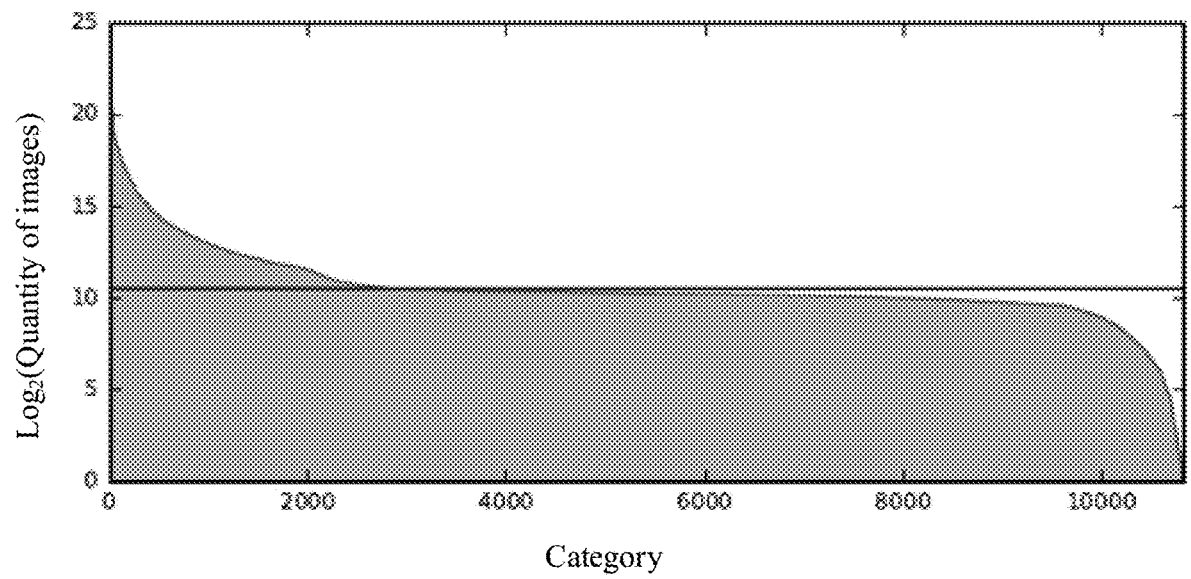
FIG. 2D is a schematic statistical chart of training images corresponding to categories in an ML-Images dataset according to an embodiment of the present disclosure.

FIG. 2D is a statistical chart of training images corresponding to the categories in the ML-Images dataset. As shown in FIG. 2D, 50% of the categories in the dataset include about 1000 images, 20% of the categories include more than 4000 images, the category including the most training images includes about 17 million images, and a few categories include no sample. The average number of training samples of the categories is about 1500.

It can be learned from the foregoing descriptions that, in one embodiment of the present disclosure, a plurality of different image sets may be automatically integrated. In addition, label supplementation is performed on a single-label image based on a relationship between labels and by using a built-in label of the single-label image as a basis, to establish a large-scale multi-label image set. Manual annotation is not required, thereby improving the efficiency of establishing a large-scale multi-label image set and improving the quality of label annotation.

One embodiment of the present disclosure provides a method for constructing a large-scale multi-label image dataset integrated based on image datasets from a plurality of sources, and the method may be used to construct the largest multi-label image dataset currently disclosed in the industry. The dataset provides materials for training a large-scale image recognition model, and can serve various vision-related services such as image recognition. For example, the dataset may be applied to image quality evaluation and image recommendation in article pushing scenarios, object recognition in games, and the like.

To better implement the foregoing method, an embodiment of the present disclosure further provides an apparatus for establishing an image set. The apparatus for establishing an image set may be specifically integrated into a network device such as a terminal or a server. The terminal may include a device such as a mobile phone, a tablet computer, a notebook computer or a PC.

Figure 3A:
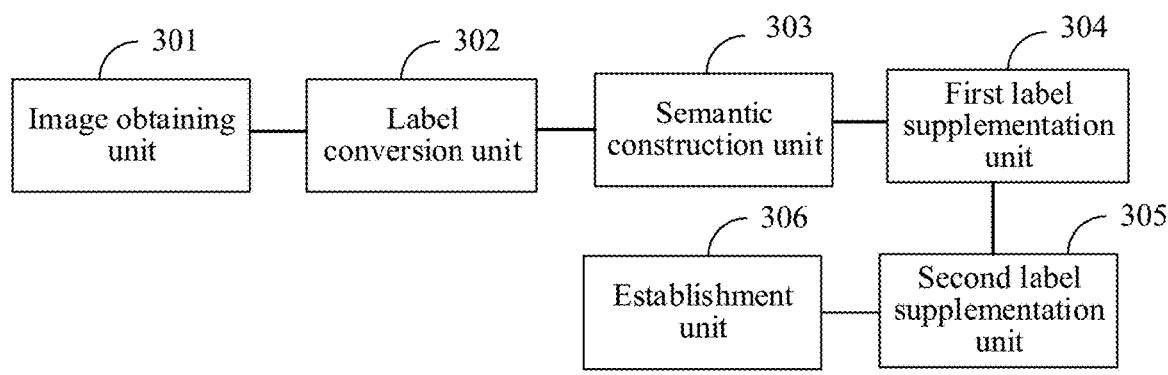
FIG. 3A is a schematic structural diagram of an apparatus for establishing an image set according to an embodiment of the present disclosure.

For example, as shown in FIG. 3A, the apparatus for establishing an image set may include an image obtaining unit 301, a label conversion unit 302, a semantic construction unit 303, a first label supplementation unit 304, a second label supplementation unit 305, and an establishment unit 306.

The image obtaining unit 301 is configured to obtain a single-label image set and a multi-label image set, the single-label image set including an image annotated with a single label, the multi-label image set including an image annotated with a plurality of labels.

The label conversion unit 302 is configured to convert the content of a label into a corresponding word identifier according to a semantic network, to obtain a word identifier set, a converted single-label image set, and a converted multi-label image set.

The semantic construction unit 303 is configured to construct a hierarchical semantic structure according to the word identifier set and the semantic network, the hierarchical semantic structure including a semantic relationship between word identifiers.

The first label supplementation unit 304 is configured to perform label supplementation on the image in the converted single-label image set according to the semantic relationship between word identifiers, to obtain a supplemented single-label image set.

The second label supplementation unit 305 is configured to perform label supplementation on the image in the supplemented single-label image set based on a cooccurrence probability of a word identifier in the supplemented single-label image set and a word identifier in the converted multi-label image set, to obtain a final supplemented image set.

The establishment unit 306 is configured to establish a target multi-label image set according to the final supplemented image set and the converted multi-label image set, to train an image recognition model by using the target multi-label image set.

Figure 3B:
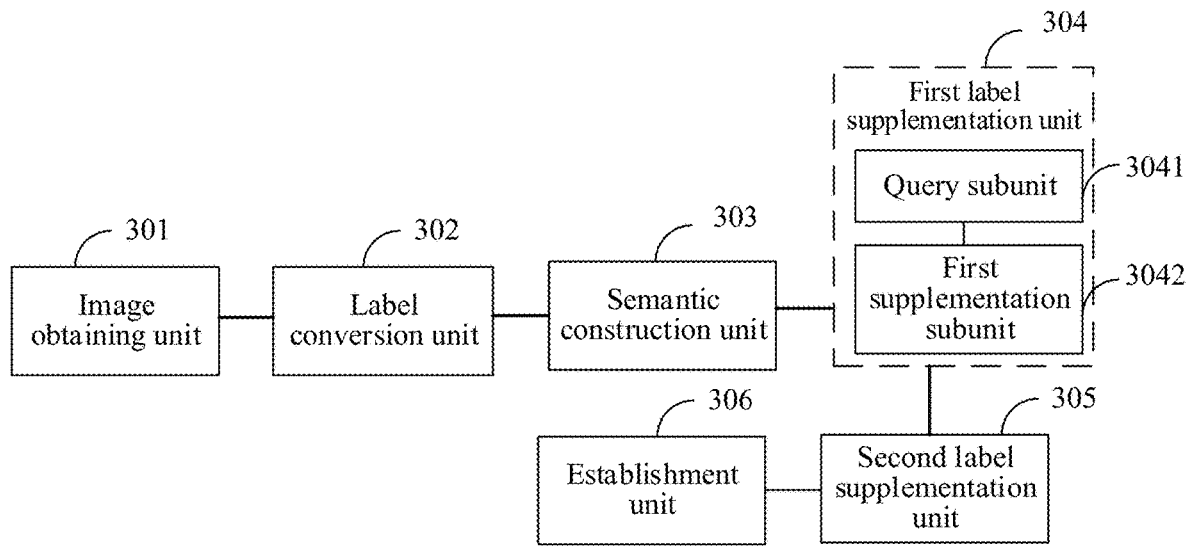
FIG. 3B is another schematic structural diagram of an apparatus for establishing an image set according to an embodiment of the present disclosure.

In an embodiment, referring to FIG. 3B, the first label supplementation unit 304 may include: a query subunit 3041, and a first supplementation subunit 3042.

The query subunit 3041 is configured to: obtain a word identifier of a single-label image in the converted single-label image set, and query the hierarchical semantic structure for an associated word identifier having a semantic relationship with the word identifier; and the first supplementation subunit 3042 is configured to supplement and annotate the associated word identifier as a label of the single-label image, to obtain the supplemented single-label image set.

In an embodiment, the label conversion unit 302 may be specifically configured to: convert the content of the label into the corresponding word identifier according to the semantic network, and merge and deduplicate same word identifiers, to obtain the word identifier set, the converted single-label image set, and the converted multi-label image set.

In an embodiment, the label conversion unit 302 may be specifically configured to: convert the content of the label into the word identifier according to the semantic network, to obtain a plurality of candidate word identifiers corresponding to the label; select a word identifier corresponding to the image from the plurality of candidate word identifiers according to an image corresponding to the label; and merge and deduplicate same word identifiers, to obtain the word identifier set, the converted single-label image set, and the converted multi-label image set.

Figure 3C:
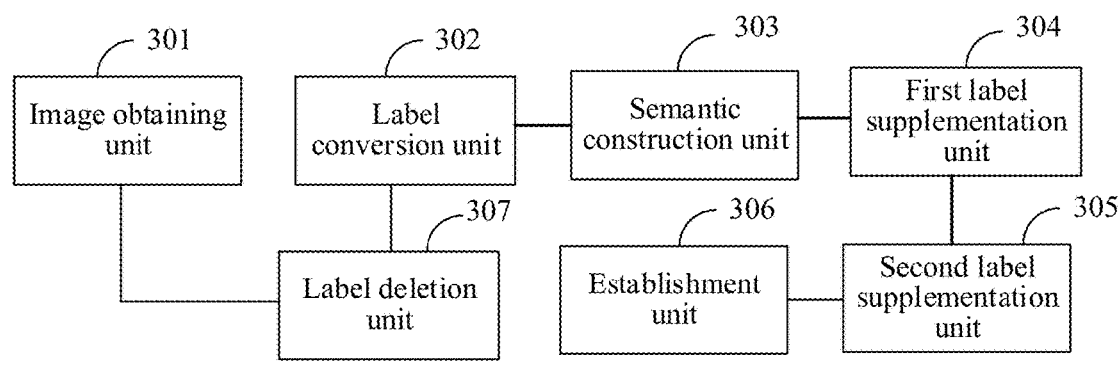
FIG. 3C is another schematic structural diagram of an apparatus for establishing an image set according to an embodiment of the present disclosure.

In an embodiment, referring to FIG. 3C, the apparatus for establishing an image set in one embodiment of the present disclosure may further include a label deletion unit 307.

The label deletion unit 307 may be specifically configured to: before the label conversion unit 302 converts the content of the label into the corresponding word identifier according to the semantic network, obtain a number of images corresponding to the label in the multi-label image set; and delete the label in a case that the number of images is less than a preset quantity.

Figure 3D:
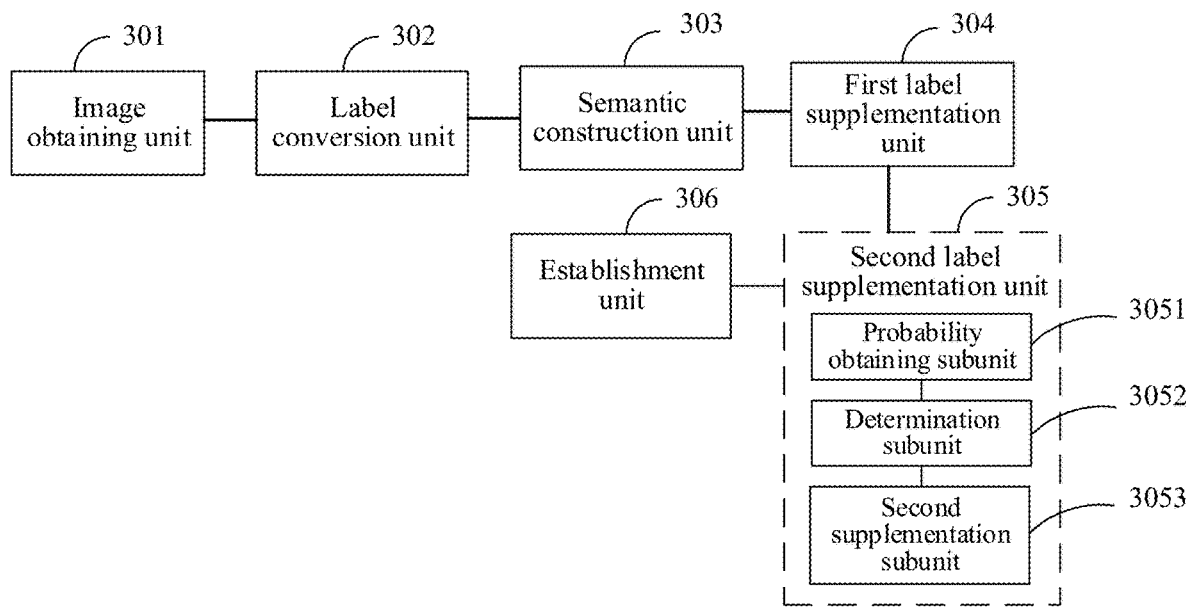
FIG. 3D is still another schematic structural diagram of an apparatus for establishing an image set according to an embodiment of the present disclosure.

In an embodiment, referring to FIG. 3D, the second label supplementation unit 305 may include: a probability obtaining subunit 3051, a determination subunit 3052, and a second supplementation subunit 3053.

The probability obtaining subunit 3051 is configured to obtain a cooccurrence probability of a first-type word identifier and a second-type word identifier, the first-type word identifier being a word identifier in the supplemented single-label image set, the second-type word identifier being a word identifier in the converted multi-label image set.

The determination subunit 3052 is configured to determine, in the second-type word identifiers according to the cooccurrence probability, a target word identifier having a strong cooccurrence relationship with the first-type word identifier, the strong cooccurrence relationship including that the cooccurrence probability is greater than a preset probability and there is no semantic relationship between the two word identifiers.

The second supplementation subunit 3053 is configured to supplement the target word identifier as a label of an image corresponding to the first-type word identifier in the supplemented single-label image set.

In an embodiment, the probability obtaining subunit 3051 may be configured to: classify, by using a trained classification model, an image with a label to be supplemented in the supplemented single-label image set, to obtain a predicted word identifier of the image with a label to be supplemented and a predicted probability of the predicted word identifier, the trained classification model being trained by using the converted multi-label image set; determine, from the predicted word identifiers according to the predicted probabilities of the predicted word identifiers, a candidate supplementary label of the image with a label to be supplemented, to obtain an image set with the label determined, each image in the image set with the label determined carrying a built-in label and the candidate supplementary label, the built-in label being the word identifier corresponding to the first-type word identifier; and obtain the cooccurrence probability of the first-type word identifier and the second-type word identifier according to the image set with the label determined.

In an embodiment, the probability obtaining subunit 3051 may be configured to: count, in the image set with the label determined, a number of images on which both the first-type word identifier and the second-type word identifier appear and a total number of images on which the first-type word identifier appears; and obtain the cooccurrence probability of the first-type word identifier and the second-type word identifier according to the number of images and the total number of images.

In an embodiment, the determination subunit 3052 may be configured to determine, in the second-type word identifiers, the target word identifier having a strong cooccurrence relationship with the first-type word identifier according to the cooccurrence probability and a semantic relationship between the first-type word identifier and the second-type word identifier. During specific implementation, the foregoing units may be implemented as independent entities, or may be randomly combined, or may be implemented as one same entity or several entities. For specific implementation of the foregoing units, reference may be made to the foregoing method embodiments. Details are not described herein again.

It can be learned from the foregoing descriptions that, the apparatus for establishing an image set in one embodiment obtains a single-label image set and a multi-label image set by using the image obtaining unit 301; converts the content of a label into a corresponding word identifier according to a semantic network by using the label conversion unit 302, to obtain a word identifier set, a converted single-label image set, and a converted multi-label image set; constructs a hierarchical semantic structure according to the word identifier set and the semantic network by using the semantic construction unit 303; performs label supplementation on the image in the converted single-label image set according to a semantic relationship between word identifiers in the hierarchical semantic structure by using the first label supplementation unit 304, to obtain the supplemented single-label image set; performs label supplementation on the image in the supplemented single-label image set based on a cooccurrence probability of a word identifier in the supplemented single-label image set and the word identifier in the converted multi-label image set by using the second label supplementation unit 305, to obtain a final supplemented image set; and establishes a target multi-label image set according to the final supplemented image set and the converted multi-label image set by using the establishment unit 306. In this solution, a plurality of different image sets may be automatically integrated. In addition, label supplementation is performed on a single-label image based on a relationship between labels and by using a built-in label of the single-label image as a basis, to establish a large-scale multi-label image set. Manual annotation is not required, thereby improving the efficiency of establishing a large-scale multi-label image set and improving the quality of label annotation. Moreover, the established large-scale multi-label image set provides materials for training a large-scale image recognition model, and can serve various vision-related services such as image recognition.

Figure 4:
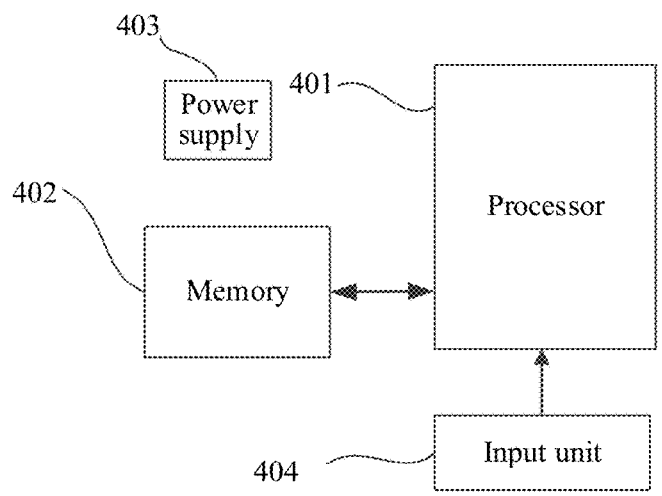
FIG. 4 is a schematic structural diagram of a network device according to an embodiment of the present disclosure.

An embodiment of the present disclosure further provides a network device. The network device may be a device such as a server or a terminal. FIG. 4 is a schematic structural diagram of a network device according to an embodiment of the present disclosure.

Specifically, the network device may include components such as a processor 401 including one or more processing cores, a memory 402 including one or more computer-readable storage media, a power supply 403, and an input unit 404. A person skilled in the art may understand that the structure of the network device shown in FIG. 4 does not constitute a limitation to the network device, and the network device may include more or fewer components than those shown in the figure, or some components may be combined, or a different component deployment may be used.

The processor 401 is a control center of the network device, and connects various parts of the entire network device by using various interfaces and lines. By running or executing software programs and/or modules stored in the memory 402, and invoking data stored in the memory 402, the processor 401 performs various functions and data processing of the network device, thereby performing overall monitoring on the network device. The processor 401 may include one or more processing cores. The processor 401 may integrate an application processor and a modem processor. The application processor mainly processes an operating system, a user interface, an application program, and the like. The modem processor mainly processes wireless communication. It may be understood that the foregoing modem processor may alternatively not be integrated into the processor 401.

The memory 402 may be configured to store a software program and module. The processor 401 runs the software program and module stored in the memory 402, to implement various functional applications and data processing. The memory 402 may mainly include a program storage area and a data storage area. The program storage area may store an operating system, an application program required by at least one function (for example, a sound playback function and an image display function), and the like. The data storage area may store data created according to use of the network device, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The network device further includes the power supply 403 for supplying power to the components. The power supply 403 may be logically connected to the processor 401 by using a power management system, thereby implementing functions such as charging, discharging, and power consumption management by using the power management system. The power supply 403 may further include one or more direct current or alternating current power supplies, a re-charging system, a power failure detection circuit, a power supply converter or inverter, a power supply state indicator, and any other component.

The network device may further include the input unit 404. The input unit 404 may be configured to receive input digit or character information and generate keyboard, mouse, joystick, optical, or trackball signal input related to user settings and function control.

Although not shown in the figure, the network device may further include a display unit, and the like. Details are not described herein again. Specifically, in one embodiment, the processor 401 in the network device may load executable files corresponding to processes of one or more application programs to the memory 402 according to the following instructions, and runs the application programs stored in the memory 402 to implement the following various functions: obtaining a single-label image set and a multi-label image set, the single-label image set including an image annotated with a single label, the multi-label image set including an image annotated with a plurality of labels; converting the content of a label into a corresponding word identifier according to a semantic network, to obtain a word identifier set, a converted single-label image set, and a converted multi-label image set; constructing a hierarchical semantic structure according to the word identifier set and the semantic network; performing label supplementation on the image in the converted single-label image set according to the semantic relationship between word identifiers in the hierarchical semantic structure, to obtain the supplemented single-label image set; performing label supplementation on the image in the supplemented single-label image set based on a cooccurrence probability of a word identifier in the supplemented single-label image set and a word identifier in the converted multi-label image set, to obtain a final supplemented image set; and establishing a target multi-label image set according to the final supplemented image set and the converted multi-label image set. Moreover, the established large-scale multi-label image set provides materials for training a large-scale image recognition model, and can serve various vision-related services such as image recognition.

For example, specifically, a word identifier of a single-label image in the converted single-label image set may be obtained, and the hierarchical semantic structure is queried for an associated word identifier having a semantic relationship with the word identifier. The associated word identifier is supplemented and annotated as a label of the single-label image, to obtain the supplemented single-label image set.

In another example, a cooccurrence probability of a first-type word identifier and a second-type word identifier is obtained, the first-type word identifier being a word identifier in the supplemented single-label image set, the second-type word identifier being a word identifier in the converted multi-label image set; a target word identifier having a strong cooccurrence relationship with the first-type word identifier is determined in the second-type word identifiers according to the cooccurrence probability; and the target word identifier is supplemented as a label of an image corresponding to the first-type word identifier in the supplemented single-label image set.

For specific implementations of the foregoing operations, reference may be made to the foregoing embodiments. Details are not described herein again.

It can be learned from the foregoing descriptions that, the network device in one embodiment may obtain a single-label image set and a multi-label image set; convert the content of a label into a corresponding word identifier according to a semantic network, to obtain a word identifier set, a converted single-label image set, and a converted multi-label image set; construct a hierarchical semantic structure according to the word identifier set and the semantic network; perform label supplementation on the image in the converted single-label image set according to a semantic relationship between word identifiers in the hierarchical semantic structure, to obtain a supplemented single-label image set; perform label supplementation on the image in the supplemented single-label image set based on a cooccurrence probability of a word identifier in the supplemented single-label image set and a word identifier in the converted multi-label image set, to obtain a final supplemented image set; and establish a target multi-label image set according to the final supplemented image set and the converted multi-label image set. In this solution, a plurality of different image sets may be automatically integrated. In addition, label supplementation is performed on a single-label image based on a relationship between labels and by using a built-in label of the single-label image as a basis, to establish a large-scale multi-label image set. Manual annotation is not required, thereby improving the efficiency of establishing a large-scale multi-label image set and improving the quality of label annotation. Moreover, the established large-scale multi-label image set provides materials for training a large-scale image recognition model, and can serve various vision-related services such as image recognition.

A person of ordinary skill in the art may understand that, all or some steps of the methods in the foregoing embodiments may be implemented through instructions, or implemented through instructions controlling relevant hardware, and the instructions may be stored in a computer-readable storage medium and loaded and executed by a processor.

Accordingly, an embodiment of the present disclosure provides a storage medium, storing a plurality of instructions. The instructions can be loaded by the processor, to perform the steps in any method for establishing an image set according to the embodiments of the present disclosure.

For example, the instructions may perform the following steps: obtaining a single-label image set and a multi-label image set, the single-label image set including an image annotated with a single label, the multi-label image set including an image annotated with a plurality of labels; converting the content of a label into a corresponding word identifier according to a semantic network, to obtain a word identifier set, a converted single-label image set, and a converted multi-label image set; constructing a hierarchical semantic structure according to the word identifier set and the semantic network; performing label supplementation on the image in the converted single-label image set according to a semantic relationship between word identifiers in the hierarchical semantic structure, to obtain a supplemented single-label image set; performing label supplementation on the image in the supplemented single-label image set based on a cooccurrence probability of a word identifier in the supplemented single-label image set and a word identifier in the converted multi-label image set, to obtain a final supplemented image set; and establishing a target multi-label image set according to the final supplemented image set and the converted multi-label image set.

The storage medium may include: a read-only memory (ROM), a random access memory (RAM), a magnetic disk, an optical disc or the like.

Since the instructions stored in the storage medium may perform the steps of any method for establishing an image set provided in the embodiments of the present disclosure, the instructions can implement beneficial effects that can be implemented by any method for establishing an image set in the embodiments of the present disclosure. For details, refer to the foregoing embodiments. Details are not described herein again.

The method and the apparatus for establishing an image set and the storage medium provided in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person skilled in the art may make modifications to the specific implementations and application range according to the idea of the present disclosure. In conclusion, the content of this specification is not to be construed as a limitation to the present disclosure.

What is claimed is:

1. A method of establishing an image set for image recognition, performed by a network device, comprising:
    obtaining a single-label image set and a multi-label image set, the single-label image set comprising an image annotated with a single label, and the multi-label image set comprising an image annotated with a plurality of labels;
    converting content of each label into a corresponding word identifier according to a semantic network, to obtain a word identifier set, a converted single-label image set, and a converted multi-label image set;
    constructing a hierarchical semantic structure according to the word identifier set and the semantic network, the hierarchical semantic structure comprising a semantic relationship between word identifiers;
    performing label supplementation on the image in the converted single-label image set according to the semantic relationship between word identifiers, to obtain a supplemented single-label image set;
    performing label supplementation on the image in the supplemented single-label image set based on a co-occurrence probability of a word identifier in the supplemented single-label image set and a word identifier in the converted multi-label image set, to obtain a final supplemented image set; and
    establishing a target multi-label image set according to the final supplemented image set and the converted multi-label image set, to train an image recognition model by using the target multi-label image set.

2. The method according to claim 1, wherein the performing label supplementation on the image in the converted single-label image set according to the semantic relationship between word identifiers, to obtain a supplemented single-label image set comprises:
    obtaining a word identifier of a single-label image in the converted single-label image set, and querying the hierarchical semantic structure for an associated word identifier having a semantic relationship with the word identifier; and
    supplementing and annotating the associated word identifier as a label of the single-label image, to obtain the supplemented single-label image set.

3. The method according to claim 1, wherein the converting content of each label into a corresponding word identifier according to a semantic network, to obtain a word identifier set, a converted single-label image set, and a converted multi-label image set comprises:
    converting the content of each label into the corresponding word identifier according to the semantic network, and merging and deduplicating same word identifiers, to obtain the word identifier set, the converted single-label image set, and the converted multi-label image set.

4. The method according to claim 3, wherein the converting the content of each label into the corresponding word identifier according to the semantic network comprises:
    converting the content of each label into the word identifier according to the semantic network, to obtain a plurality of candidate word identifiers corresponding to the label; and
    selecting a word identifier corresponding to the image from the plurality of candidate word identifiers according to an image corresponding to the label, as the corresponding word identifier.

5. The method according to claim 1, wherein before the converting content of each label into a corresponding word identifier according to a semantic network, the method further comprises:
    obtaining a number of images corresponding to the label in the multi-label image set; and
    deleting the label in a case that the number of images is less than a preset quantity.

6. The method according to claim 1, wherein the performing label supplementation on the image in the supplemented single-label image set based on a co-occurrence probability of a word identifier in the supplemented single-label image set and a word identifier in the converted multi-label image set comprises:
    obtaining a co-occurrence probability of a first-type word identifier and a second-type word identifier, the first-type word identifier being a word identifier in the supplemented single-label image set, the second-type word identifier being a word identifier in the converted multi-label image set;
    determining, in the second-type word identifiers according to the co-occurrence probability, a target word identifier having a strong co-occurrence relationship with the first-type word identifier, the strong co-occurrence relationship comprising that the co-occurrence probability is greater than a preset probability and there is no semantic relationship between the two word identifiers; and supplementing the target word identifier as a label of an image corresponding to the first-type word identifier in the supplemented single-label image set.

7. The method according to claim 6, wherein the obtaining a co-occurrence probability of a first-type word identifier and a second-type word identifier comprises:

classifying, by using a trained classification model, an image with a label to be supplemented in the supplemented single-label image set, to obtain a predicted word identifier of the image with a label to be supplemented and a predicted probability of the predicted word identifier, the trained classification model being trained by using the converted multi-label image set;

determining, from the predicted word identifiers according to the predicted probabilities of the predicted word identifiers, a candidate supplementary label of the image with a label to be supplemented, to obtain an image set with the label determined, each image in the image set with the label determined carrying a built-in label and the candidate supplementary label, the built-in label being the word identifier corresponding to the first-type word identifier; and obtaining the co-occurrence probability of the first-type word identifier and the second-type word identifier according to the image set with the label determined.

8. The method according to claim 7, wherein the obtaining the co-occurrence probability of the first-type word identifier and the second-type word identifier according to the image set with the label determined comprises:

counting, in the image set with the label determined, a number of images on which both the first-type word identifier and the second-type word identifier appear and a total number of images on which the first-type word identifier appears; and obtaining the cooccurrence probability of the first-type word identifier and the second-type word identifier according to the number of images and the total number of images.

9. The method according to claim 6, wherein the determining, in the second-type word identifiers according to the co-occurrence probability, a target word identifier having a strong co-occurrence relationship with the first-type word identifier comprises:

determining, in the second-type word identifiers, the target word identifier having a strong co-occurrence relationship with the first-type word identifier according to the co-occurrence probability and a semantic relationship between the first-type word identifier and the second-type word identifier.

10. A network device, comprising:

a memory storing computer program instructions; and a processor coupled to the memory and, when executing the computer program instructions, configured to perform:

obtaining a single-label image set and a multi-label image set, the single-label image set comprising an image annotated with a single label, and the multi-label image set comprising an image annotated with a plurality of labels;

converting content of each label into a corresponding word identifier according to a semantic network, to obtain a word identifier set, a converted single-label image set, and a converted multi-label image set;

constructing a hierarchical semantic structure according to the word identifier set and the semantic network, the hierarchical semantic structure comprising a semantic relationship between word identifiers;

performing label supplementation on the image in the converted single-label image set according to the semantic relationship between word identifiers, to obtain a supplemented single-label image set;

performing label supplementation on the image in the supplemented single-label image set based on a co-occurrence probability of a word identifier in the supplemented single-label image set and a word identifier in the converted multi-label image set, to obtain a final supplemented image set; and establishing a target multi-label image set according to the final supplemented image set and the converted multi-label image set, to train an image recognition model by using the target multi-label image set.

11. The network device according to claim 10, wherein the performing label supplementation on the image in the converted single-label image set according to the semantic relationship between word identifiers, to obtain a supplemented single-label image set comprises:

obtaining a word identifier of a single-label image in the converted single-label image set, and querying the hierarchical semantic structure for an associated word identifier having a semantic relationship with the word identifier; and supplementing and annotating the associated word identifier as a label of the single-label image, to obtain the supplemented single-label image set.

12. The network device according to claim 10, wherein the converting content of each label into a corresponding word identifier according to a semantic network, to obtain a word identifier set, a converted single-label image set, and a converted multi-label image set comprises:

converting the content of each label into the corresponding word identifier according to the semantic network, and merging and deduplicating same word identifiers, to obtain the word identifier set, the converted single-label image set, and the converted multi-label image set.

13. The network device according to claim 12, wherein the converting the content of each label into the corresponding word identifier according to the semantic network comprises:

converting the content of each label into the word identifier according to the semantic network, to obtain a plurality of candidate word identifiers corresponding to the label; and selecting a word identifier corresponding to the image from the plurality of candidate word identifiers according to an image corresponding to the label, as the corresponding word identifier.

14. The network device according to claim 10, wherein before the converting content of each label into a corresponding word identifier according to a semantic network, the processor is further configured to perform:

obtaining a number of images corresponding to the label in the multi-label image set; and deleting the label in a case that the number of images is less than a preset quantity.

15. The network device according to claim 10, wherein the performing label supplementation on the image in the supplemented single-label image set based on a co-occurrence probability of a word identifier in the supplemented single-label image set and a word identifier in the converted multi-label image set comprises:

obtaining a co-occurrence probability of a first-type word identifier and a second-type word identifier, the first-type word identifier being a word identifier in the supplemented single-label image set, the second-type word identifier being a word identifier in the converted multi-label image set;

determining, in the second-type word identifiers according to the co-occurrence probability, a target word identifier having a strong co-occurrence relationship with the first-type word identifier, the strong co-occurrence relationship comprising that the co-occurrence probability is greater than a preset probability and there is no semantic relationship between the two word identifiers; and supplementing the target word identifier as a label of an image corresponding to the first-type word identifier in the supplemented single-label image set.

16. The network device according to claim 15, wherein the obtaining a co-occurrence probability of a first-type word identifier and a second-type word identifier comprises:

classifying, by using a trained classification model, an image with a label to be supplemented in the supplemented single-label image set, to obtain a predicted word identifier of the image with a label to be supplemented and a predicted probability of the predicted word identifier, the trained classification model being trained by using the converted multi-label image set;

determining, from the predicted word identifiers according to the predicted probabilities of the predicted word identifiers, a candidate supplementary label of the image with a label to be supplemented, to obtain an image set with the label determined, each image in the image set with the label determined carrying a built-in label and the candidate supplementary label, the built-in label being the word identifier corresponding to the first-type word identifier; and obtaining the cooccurrence probability of the first-type word identifier and the second-type word identifier according to the image set with the label determined.

17. The network device according to claim 16, wherein the obtaining the co-occurrence probability of the first-type word identifier and the second-type word identifier according to the image set with the label determined comprises:

counting, in the image set with the label determined, a number of images on which both the first-type word identifier and the second-type word identifier appear and a total number of images on which the first-type word identifier appears; and obtaining the co-occurrence probability of the first-type word identifier and the second-type word identifier according to the number of images and the total number of images.

18. The network device according to claim 15, wherein the determining, in the second-type word identifiers according to the co-occurrence probability, a target word identifier having a strong co-occurrence relationship with the first-type word identifier comprises:

determining, in the second-type word identifiers, the target word identifier having a strong co-occurrence relationship with the first-type word identifier according to the co-occurrence probability and a semantic relationship between the first-type word identifier and the second-type word identifier.

19. A non-transitory computer-readable storage medium storing computer program instructions executable by at least one processor to perform:

obtaining a single-label image set and a multi-label image set, the single-label image set comprising an image annotated with a single label, and the multi-label image set comprising an image annotated with a plurality of labels;

converting content of each label into a corresponding word identifier according to a semantic network, to obtain a word identifier set, a converted single-label image set, and a converted multi-label image set;

constructing a hierarchical semantic structure according to the word identifier set and the semantic network, the hierarchical semantic structure comprising a semantic relationship between word identifiers;

performing label supplementation on the image in the converted single-label image set according to the semantic relationship between word identifiers, to obtain a supplemented single-label image set;

performing label supplementation on the image in the supplemented single-label image set based on a co-occurrence probability of a word identifier in the supplemented single-label image set and a word identifier in the converted multi-label image set, to obtain a final supplemented image set; and establishing a target multi-label image set according to the final supplemented image set and the converted multi-label image set, to train an image recognition model by using the target multi-label image set.

20. The non-transitory computer-readable storage medium according to claim 19, wherein the performing label supplementation on the image in the converted single-label image set according to the semantic relationship between word identifiers, to obtain a supplemented single-label image set comprises:

obtaining a word identifier of a single-label image in the converted single-label image set, and querying the hierarchical semantic structure for an associated word identifier having a semantic relationship with the word identifier; and supplementing and annotating the associated word identifier as a label of the single-label image, to obtain the supplemented single-label image set.

\* \* \* \* \*